United States Patent
Iizuka

(10) Patent No.: US 8,069,441 B2
(45) Date of Patent: Nov. 29, 2011

(54) METHOD FOR CONSTRUCTING JOB OPERATION ENVIRONMENT

(75) Inventor: Daisuke Iizuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1376 days.

(21) Appl. No.: 11/473,091

(22) Filed: Jun. 21, 2006

(65) Prior Publication Data

US 2007/0261056 A1    Nov. 8, 2007

(30) Foreign Application Priority Data

Feb. 17, 2006  (JP) .................................. 2006-040123

(51) Int. Cl.
    G06F 9/445    (2006.01)
(52) U.S. Cl. .......................... 717/174; 717/168; 718/101
(58) Field of Classification Search .......................... None
    See application file for complete search history.

(56) References Cited

U.S. PATENT DOCUMENTS

| | | | | |
|---|---|---|---|---|
| 5,805,898 | A * | 9/1998 | Barsness et al. | 717/175 |
| 6,434,744 | B1 * | 8/2002 | Chamberlain et al. | 717/168 |
| 6,678,888 | B1 * | 1/2004 | Sakanishi | 717/172 |
| 6,804,774 | B1 * | 10/2004 | Larvoire et al. | 713/2 |
| 7,330,967 | B1 * | 2/2008 | Pujare et al. | 713/2 |
| 7,356,679 | B1 * | 4/2008 | Le et al. | 713/1 |
| 7,496,912 | B2 * | 2/2009 | Keller et al. | 717/174 |
| 7,716,660 | B2 * | 5/2010 | Mackay | 717/173 |
| 2003/0055919 | A1 * | 3/2003 | Fong et al. | 709/220 |
| 2004/0181790 | A1 * | 9/2004 | Herrick | 717/168 |
| 2006/0075399 | A1 * | 4/2006 | Loh et al. | 717/174 |
| 2006/0130040 | A1 * | 6/2006 | Subramanian et al. | 717/168 |

FOREIGN PATENT DOCUMENTS

| | | | |
|---|---|---|---|
| JP | 06-095861 | A | 4/1994 |
| JP | 11-003297 | | 1/1999 |
| JP | 2001-067225 | A | 3/2001 |
| JP | 2001-356912 | A | 12/2001 |
| JP | 2006-011506 | A | 1/2006 |
| JP | 2006-011781 | A | 1/2006 |

OTHER PUBLICATIONS

Gujarathi et al. "Scripting Dell Update Packages", Oct. 2004, Dell Power Solutions.*
Todd Mathers, "Windows Server 2003/2000 Terminal Solutions, Third Edition", Dec. 2004, Addison Wesley Professional, Section "Windows Service Pack and Hotfix Installation".*
Japan Patent Office office action for patent application JP2006-040123 (Aug. 2, 2011).

* cited by examiner

*Primary Examiner* — Lewis Bullock, Jr.
*Assistant Examiner* — Jue Wang
(74) *Attorney, Agent, or Firm* — Kilpatrick Townsend & Stockton LLP

(57) ABSTRACT

To construct an operation environment for a job by deploying in a computer an operating system and various programs as a premise of operation of a job program of the job of which operation is to be started in a job system, there is selected an optimized construction procedure requiring the shortest construction time. Various application programs and patch programs for the deployment included in the saved disk images are compared with the various programs as a premise of the job operation to obtain a period of time to uninstall unnecessary programs, a period of time to install lacking programs, and a period of time to deploy the disk image on the computer. An estimated construction time is obtained by adding the periods of time to each other. By optimizing the uninstallation and installation procedure, the estimated construction time is reduced to the maximum extent.

11 Claims, 27 Drawing Sheets

FIG. 4

| PROGRAM LAYOUT NAME | IMAGE FILE NAME | IN-USE OS | COMPUTER TYPE | DELETABLE | MEAN DEPLOYMENT TIME | NUMBER OF DEPLOYMENTS |
|---|---|---|---|---|---|---|
| M1 OS1 | IMG0 | OS1 | M1 | NO | 300 SEC. | 10 |
| JOB 1 - WEB TIER | IMG1 | OS1 | M1 | YES | 400 SEC. | 4 |
| JOB 1 - AP LAYER | IMG2 | OS1 | M1 | YES | 400 SEC. | 6 |
| M2 OS1 | IMG3 | OS2 | M2 | NO | 350 SEC. | 8 |
| JOB 1 - DB LAYER | IMG4 | OS2 | M2 | YES | 450 SEC. | 2 |
| JOB 1 - CONTROL SERVER | IMG5 | OS1 | M1 | YES | 350 SEC. | 0 |
| JOB 2 - WEB TIER | IMG6 | OS1 | M1 | YES | 400 SEC. | 1 |
| ... | ... | ... | ... | ... | ... | ... |

| PROGRAM NAME | IN-USE OS | PACKAGE FILE NAME | AFTER-INSTALLATION OS RESTART | SUC-CESSIVELY INSTALLABLE PROGRAM | PATCH OBJECT | UNIN-STALLABLE | AFTER-UNIN-STALLATION OS RESTART | SUCCESSIVELY UNIN-STALLABLE PROGRAM |
|---|---|---|---|---|---|---|---|---|
| AP1 | OS1 | AP1-OS1.zip | REQUIRED | N/A | N/A | YES | NOT REQUIRED | N/A |
| AP1 PATCH A | OS1 | AP1-OS1-pA.zip | NOT REQUIRED | N/A | AP1 | NO | NOT REQUIRED | N/A |
| OS1 PATCH B | OS1 | OS1-pB.zip | REQUIRED | OS1 PATCH C | OS1 | YES | REQUIRED | OS1 PATCH C |
| OS1 PATCH C | OS1 | OS2-pC.zip | REQUIRED | OS1 PATCH B | OS1 | YES | REQUIRED | OS1 PATCH B |
| AP2 | OS2 | AP2-OS2.zip | NOT REQUIRED | N/A | N/A | YES | NOT REQUIRED | N/A |
| AP3 | OS1 | AP3-OS1.zip | NOT REQUIRED | N/A | N/A | YES | REQUIRED | N/A |
| AP4 | OS2 | AP4-OS2.zip | REQUIRED | N/A | N/A | YES | REQUIRED | N/A |
| AP5 | OS2 | AP1-OS2.zip | REQUIRED | N/A | N/A | YES | NOT REQUIRED | N/A |
| ... | ... | ... | ... | ... | ... | ... | ... | ... |
| 120 | 121 | 122 | 123 | 124 | 125 | 126 | 127 | 128 |

FIG. 6

| PROGRAM NAME | IN-USE OS | COMPUTER TYPE | MEAN INSTALLATION TIME | MEAN RESTART TIME AT INSTALLATION | NUMBER OF INSTALLATIONS | MEAN UNIN-STALLATION TIME | MEAN RESTART TIME AT UNIN-STALLATION | NUMBER OF UNIN-STALLATIONS |
|---|---|---|---|---|---|---|---|---|
| AP1 | OS1 | M1 | 200 SEC. | 60 SEC. | 5 | 200 SEC. | 60 SEC. | 1 |
| AP1 PATCH A | OS1 | M1 | 100 SEC. | 0 SEC. | 3 | 100 SEC. | 0 SEC. | 0 |
| OS1 PATCH B | OS1 | M1 | 5 SEC. | 60 SEC. | 12 | 5 SEC. | 60 SEC. | 0 |
| OS1 PATCH C | OS1 | M1 | 5 SEC. | 70 SEC. | 23 | 5 SEC. | 70 SEC. | 0 |
| AP2 | OS2 | M2 | 150 SEC. | 0 SEC. | 10 | 150 SEC. | 0 SEC. | 1 |
| AP3 | OS1 | M1 | 110 SEC. | 0 SEC. | 20 | 110 SEC. | 0 SEC. | 0 |
| AP4 | OS2 | M2 | 100 SEC. | 60 SEC. | 10 | 100 SEC. | 60 SEC. | 2 |
| AP5 | OS1 | M1 | 80 SEC. | 70 SEC. | 5 | 80 SEC. | 70 SEC. | 0 |
| ... | ... | ... | ... | ... | ... | ... | ... | ... |

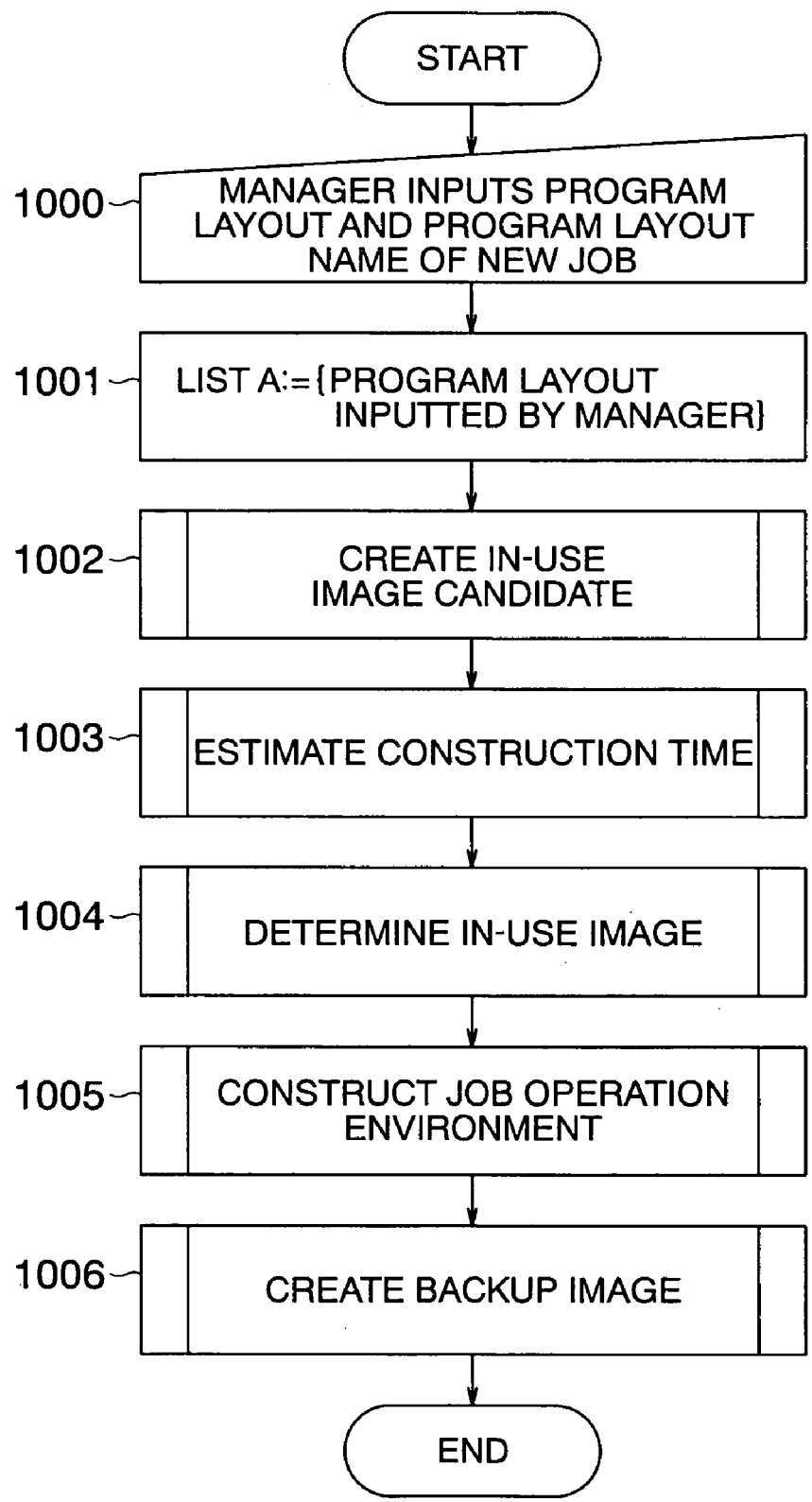

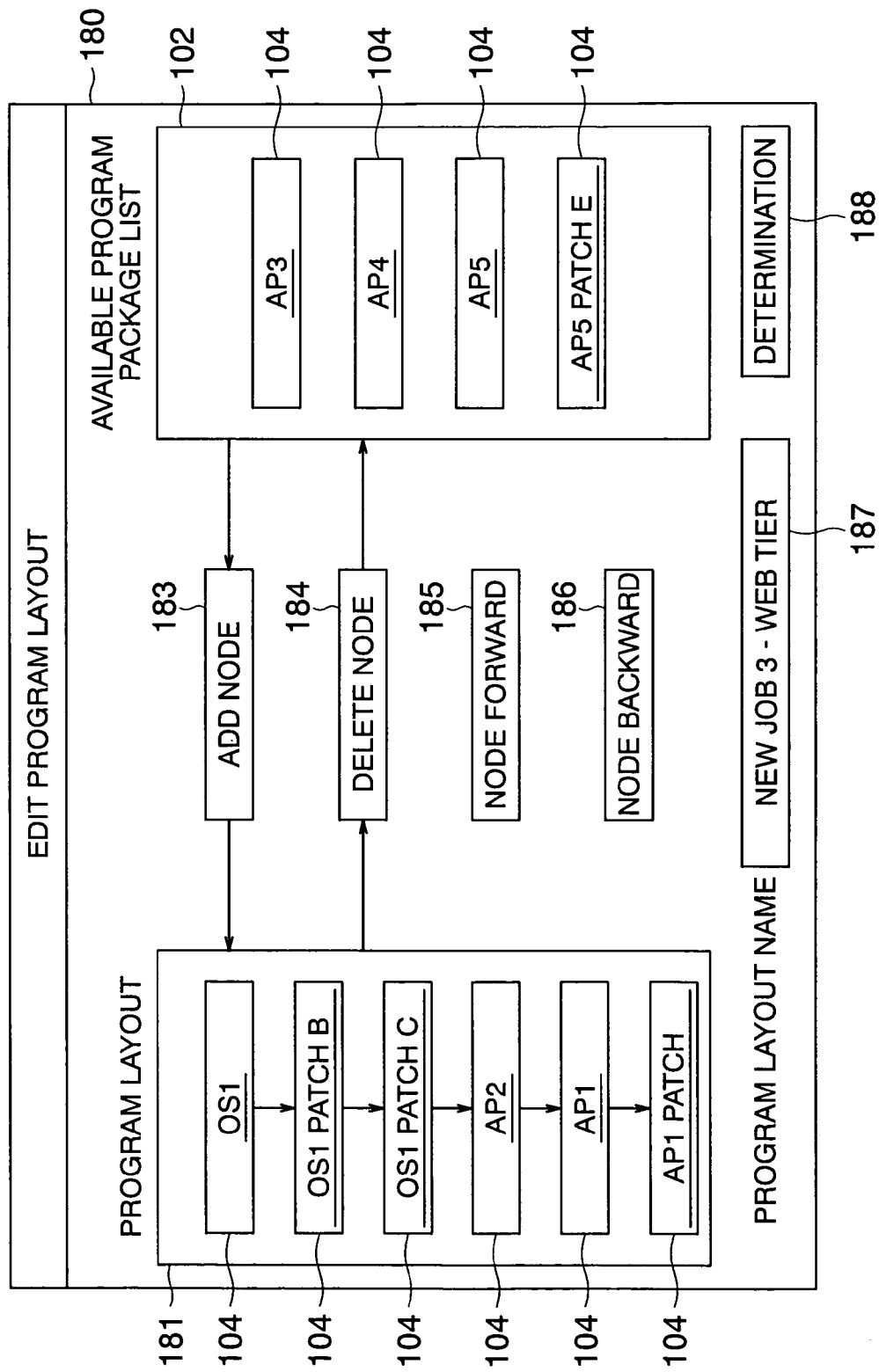

FIG. 26

| PROGRAM NAME | COMPATIBLE PROGRAM NAME |
|---|---|
| AP1 | AP1-v1.1, AP1-v1.2 |
| AP2 | AP2-v1.5, AP2-v2 |
| AP3 | AP5, AP6, AP8 |
| ... | ... |

METHOD FOR CONSTRUCTING JOB OPERATION ENVIRONMENT

INCORPORATION BY REFERENCE

The present application claims priority from Japanese application JP2006-040123 filed on Feb. 17, 2006, the content of which is hereby incorporated by reference into this application.

BACKGROUND OF THE INVENTION

The present invention relates to a technique for use with a system including a large number of computers such as a blade server for constructing a job operation environment by use of a boot disk image.

To initiate operation of a job using computers such as a Web three-tier job, it is required to construct an operation environment in which a job intrinsic application and job intrinsic data are deployed. The job operation environment is constructed in the following procedure. First, there is determined a computer to conduct operation of the job. Next, an operating system (OS), device drivers, application programs and patch programs to remove faults of the operating system and to expand functions of the operating system are installed in the computer. Thereafter, patch programs to remove faults and to expand functions of the application programs are installed. After the application programs and the patch programs are installed, it is required in some cases to restart the operating system to execute setup processing of the programs and/or to execute program initiation processing.

In general, to construct one operation environment, the procedure to install programs and patches and the procedure to restart the operating system described above are required to be conducted several times. That is, it takes a long period of time to construct an operation environment. Therefore, it has been a common practice that, at a point of time considerably before the job operation start, the operation system, application programs, and patch programs were installed in the computer to beforehand create a disk image using a disk of the computer. At a point of time near the job operation start, the disk image was deployed in the computer to thereby reduce the period of time required to construct the job operation environment. Technical articles associated with the technique include JP-A-11-003297.

SUMMARY OF THE INVENTION

In the conventional technique, it is necessary to beforehand create a disk image including an operating system, programs, and patches to be deployed in the operation environment of a job for which the operation is to be started. In a situation in which the job operation start time is approaching and such disk image has not been created, it is required to manually construct the job operation environment beginning at a first step of the construction. This leads to a problem that the construction of the job operation environment takes a long period of time.

To solve the problem, it can also be considered to construct the operation environment using a disk image including part of the operating system, programs, and patches necessary to be deployed in the job operation environment. The construction procedure is as follows. First, the disk image is deployed in the computer. Then, each application program and each patch program which are contained in the disk image but which are not required for the job operation environment are uninstalled from the computer. Thereafter, application program and patch program lacking for the job operation environment are installed in the computer. After the installation or the uninstallation of the application programs and the patch programs, the operation system is restarted according to necessity. Through the execution of the processing, the job operation environment can be constructed in a shorter period of time as compared with the case in which the job operation environment is manually constructed beginning at the first step of the construction.

In a situation in which the method of constructing the job operation environment is employed, to possibly reduce the construction time to construct the job operation environment, it is required to know or to determine which one of the disk images is to be used, how to install/uninstall application programs and patch programs, and how to restart the operating system. The conventional technique lacks in the scheme or the method to know these factors.

It is therefore an object of the present invention that the construction time to construct the job operation environment is estimated by use of a disk image including part of the to-be-deployed programs required to be deployed for the job to thereby select an appropriate disk image to resultantly optimize the construction procedure of the job operation environment. In the specification, "deployment" of a program indicates that the program is installed to be set up in a computer so that the program operates on the computer. The to-be-deployed programs are the programs as a premise of operation of the job programs on the computer. The to-be-deployed programs include, for example, library programs and middleware.

According to the present invention, various programs included in a disk image are compared with the to-be-deployed programs for a job under consideration to estimate (1) a period of time to deploy the disk image in the computer, (2) a period of time to uninstall the unnecessary programs, and (3) a period of time to install the lacking programs. For items (2) and (3), the period of time is estimated including also the period of time to restart the operating system. The estimated construction time is obtained by adding the periods of time of items (1), (2), and (3) to each other.

In this situation, by optimizing the procedure to uninstall the unnecessary programs and the procedure to install the lacking programs, the estimated construction time is possibly reduced. Since the optimized construction procedure differs from the inherent construction procedure, it is not guaranteed that the operation environment constructed in such procedure operates normally. Therefore, a check is made to determine whether or not the operation environment constructed in the optimized construction procedure is acceptable, by referring to knowledge such as contents of a database externally provided. Or, the user confirms the acceptability of the operation environment.

The method of reducing the number of operations to restart the operating system is as follows. Assume that two application programs or patch programs A and B are installed and the operating system is required to be restarted after the patch programs A and B are installed. According to the inherent construction procedure, the operating system is restarted after the patch program A is installed. Thereafter, the patch program B is installed and then the operating system is restarted. A check is made, by referring to external knowledge such as a database, for acceptability of a short procedure in which the patch programs A and B are successively installed and then the operation system is restarted. If it is determined that the short procedure is acceptable, the short procedure is adopted to reduce the number of operating system restarts. This procedure is similarly employed when a larger number of application programs or patch programs are installed or uninstalled. Examples of programs which can be successively installed as above are application programs mutually independent of each other.

Assume that, for an application program C, there exist two application programs D and E as a premise of operation of the application program C. Assume that there does not exist any relationship as a premise between the application programs D and E. In this case, the programs D and E are application programs mutually independent of each other. For the application programs mutually independent of each other described above, the setup processings as well as the program start processings respectively executed by the application programs after the operating system is restarted are independent of each other in many cases. Therefore, even in a case in which the operation restart is inherently required after the installation of each application program, it is possible in many cases to normally operate the application programs without any trouble when the application programs are successively installed and then the operating system is restarted.

The method of reducing the number of uninstallations is as follows. Assume that there exists a patch program B for an application program A and the programs A and B are installed in this sequence. In general, a patch program replaces files of the patch objective program. Therefore, an operation to uninstall the application program A is equivalent to an operation in which the application program A and the patch program B are simultaneously uninstalled. That is, it is not required in this situation to explicitly uninstall the patch program.

According to the present invention, since the construction time to construct the job operation environment can be estimated, it is possible to determine which one of the disk images is to be used to possibly reduce the construction time. According to the present invention, by optimizing the procedure to uninstall or to install application programs and patch programs, the construction time can be reduced as compared with a case in which the programs are uninstalled and are then installed in the ordinary sequence. Particularly, the scheme to reduce the number of operating system restarts is efficiently applicable to a job using a server computer including a large-capacity memory and/or a large-sized peripheral device. In such computer including a large-capacity memory and/or a large-sized peripheral device, when the computer is restarted, quite a long period of time is required to initialize and to check operation of its memory and its peripheral devices. Therefore, reducing the operating system restarts in the computer of this type is remarkably effective to minimize the construction time of the job operation environment.

Other objects, features and advantages of the invention will become apparent from the following description of the embodiments of the invention taken in conjunction with the accompanying drawings.

BRIEF DESCRIPTION OF THE DRAWINGS

FIG. 4 is a data layout diagram showing an image control table 28 of the first embodiment.

FIG. 5 is a data layout diagram showing a package control table 29 of the first embodiment.

FIG. 6 is a data layout diagram showing a deployment time history table 30 of the first embodiment.

FIG. 7 is a flowchart showing processing to construct a job operation environment in the first embodiment.

FIG. 8 is a view of a screen image showing an input user interface in which a manager inputs a program layout and a program layout name in the first embodiment.

FIG. 26 is a data layout diagram of a compatible program name table 31 in a third embodiment.

DESCRIPTION OF THE EMBODIMENTS

First Embodiment

Figure 1:
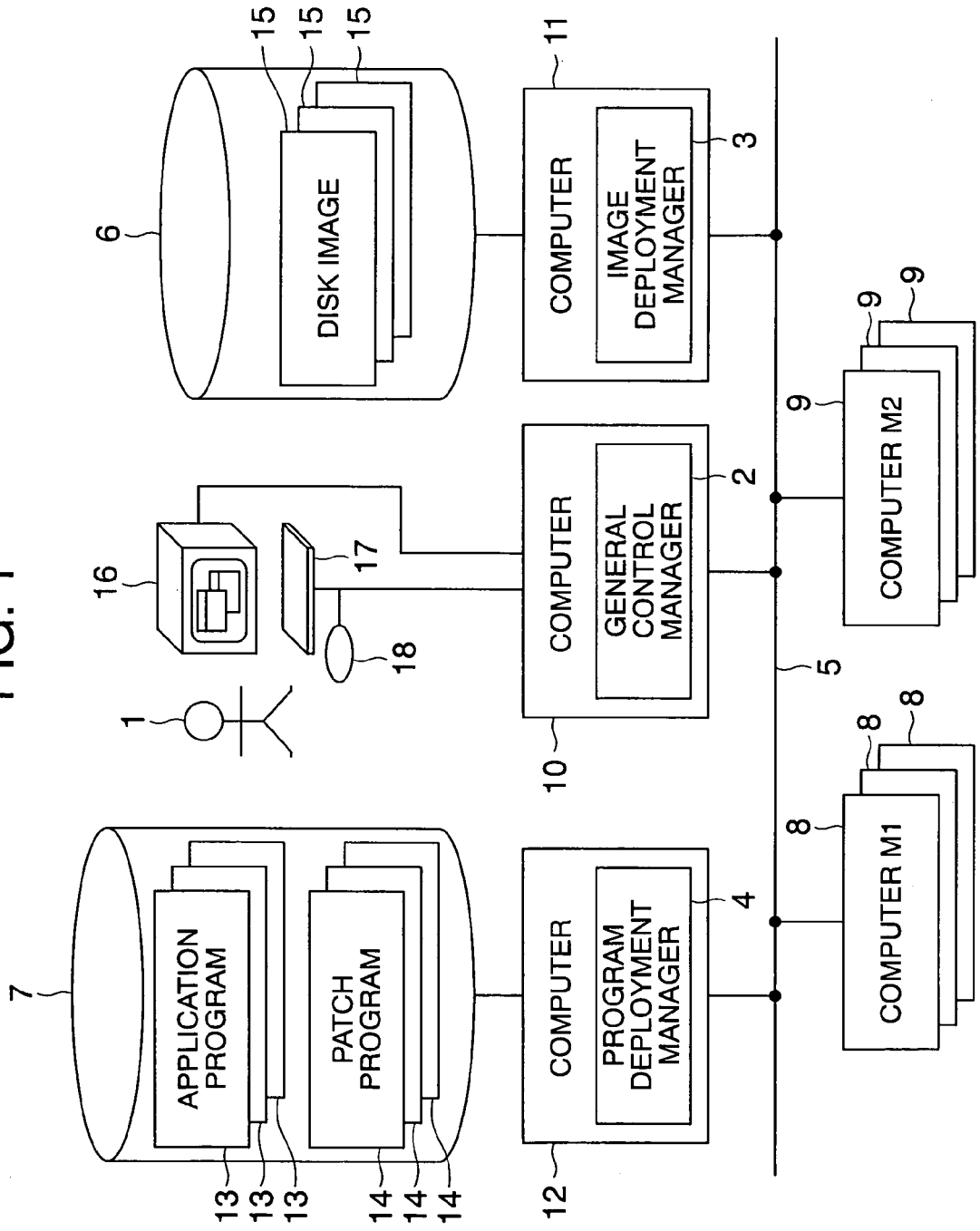
FIG. 1 is a block diagram showing an overall configuration of a first embodiment of a computer system for job operation according to the present invention.

Next, referring to the drawings, description will be given of a first embodiment of the present invention.

FIG. 1 shows an overall configuration of the first embodiment of a computer system for job operation in a block diagram. The system includes a computer 10 on which programs of a general control manager 2 operate, a computer 11 on which an image deployment manager 3 operates, a computer 12 on which a program deployment manager 4 operates, a computer 8 of type M1, a computer 9 of type M2, a disk image storage 6, and a program package storage 7. The system includes a plurality of computers 8 and a plurality of computers 9. Each of the computers 8 and 9 may be an ordinary server computer or a blade server or may be implemented by logically dividing one computer.

The computers 8 to 12 are connected via a network 5 to each other to be mutually communicable with each other. Job programs operate on the computer 8 or 9. When the manager 1 supplies an instruction to the general control manager 2 using a display 16, a keyboard 17, and a mouse 18, an operation environment of job programs are constructed by a function of the general control manager 2.

The disk image storage 6 stores therein a plurality of disk images 15 to be deployed in the computers 8 and 9.

The program package storage 7 stores therein a plurality of program packages each of which includes programs, i.e., application programs 13 and patch programs 14 to be installed on an operating system running on the computers 8 and 9. Each application program 13 can operate by itself. Each patch program 14 is a program which replaces part of an execution file, part of a data file, and/or part of the contents of setting information included in the operating system and/or the application program 13 to thereby change operation of the operating system and/or the application program.

The image deployment manager 3 is a program having a function to deploy in the computer 8 and/or the computer 9 the disk images 15 stored in the disk image storage 6 so that the operating system can be started on the computer 8 and/or the computer 9. The image deployment manager 3 has a function to create a disk image using the computer 8 and/or the computer 9 to store the disk image in the storage 6.

The program deployment manager 4 is a program having a function to install the programs packaged in the program package storage 7 on the computer 8 and/or the computer 9 on which the operating system is running. The program deployment manager 4 is a program having a function to install the programs packaged in the program package storage 7 on the computer 8 and/or the computer 9 on which the operating system is running. The manager 4 further has a function to uninstall a program from the computer 8 and/or the computer 9 on which the operating system is running and a function to restart the operating system on the computer 8 and/or the computer 9.

The general control manager 2 is a program to implement a job operation environment construction method according to the present invention. The manager 2 receives a job program layout from the manager 1 and instructs the image deployment manager 3 and the program deployment manager 4 to construct the job operation environment on the computer 8 or 9. The program layout includes information such as the target computer, the operating system running thereon, the installation sequence in which application programs 13 and/or the patch programs 14 are to be installed, and the past installation sequence in which the application programs 13 and/or the patch programs 14 have been installed. As shown in a program layout list 103 of FIG. 3, the program layout can be expressed as a list including program names as nodes. The programs are installed according to the order of the nodes in the list. Particular one or two selected from the general control manager 2, the image deployment manager 3, and the program deployment manager 4 may operate on one and the same computer. Also, a plurality of image deployment managers 3 and a plurality of program deployment managers 4 may exist in the system. Such image deployment managers 3 may be mutually different products of mutually different firms. This also applies to the program deployment managers 4.

The disk image storage 6 stores therein a plurality of disk images to be deployed in the computer 8 and/or the computer 9.

Figure 2:
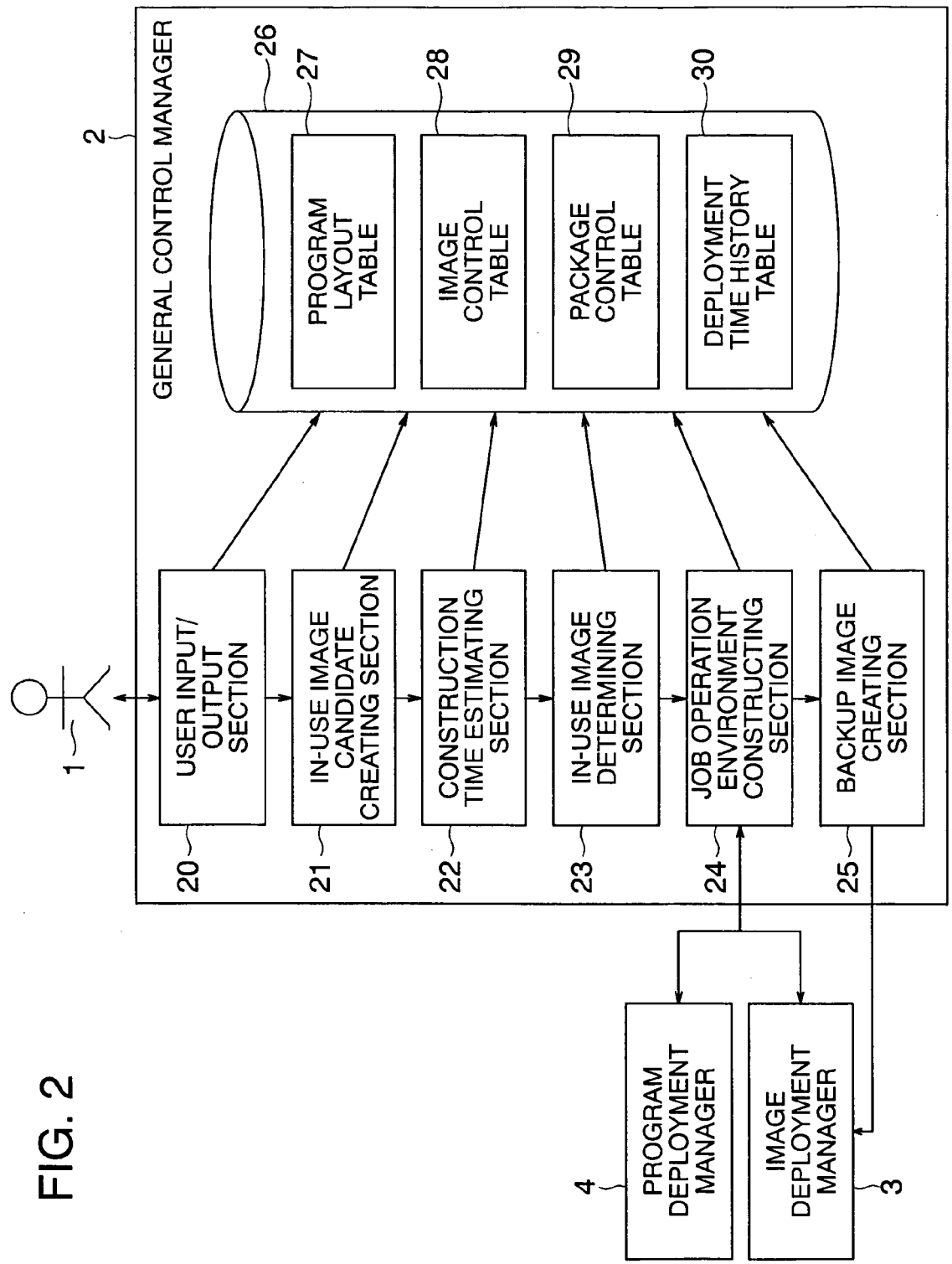
FIG. 2 is a function block diagram of a general control manager 2 of the first embodiment.

FIG. 2 shows function blocks and a data layout of the general control manager 2. The function blocks includes a user input section 20, an in-use image candidate creating section 21, a construction time estimating section 22, an in-use image determining section 23, a job operation environment constructing section 24, and a backup image creating section 25. The data layout of the manager 2 includes a program layout table 27, an image control table 28, a package control table 29, and a deployment time history table 30. The contents of these tables are held in a table storage area 26.

The user input section 20 is a function block which presents a user interface to the manager 1 to receive information inputted by the manager 1. The input section 20 receives from the manager 1 a program layout and a program layout name of a job of which the operation is to be started and then transfers the information items to the in-use image candidate creating section 21. Also, the input section 20 receives from the manager 1 the contents respectively of the program layout table 27, the image control table 28, the package control table 29, and the deployment time history table 30 to update the contents of the respective tables.

The in-use image candidate creating section 21 is a function block to obtain, from the disk images held in the disk image storage 6, disk images enabling construction of the job program layout supplied to the user input section 20.

The construction time estimating section 22 is a function block which estimates, using the disk images obtained by the in-use image candidate creating section 21, periods of time required to construct the job program layout inputted from the manager 1.

The in-use image determining section 23 is a function block to determine, according to the construction time estimated by the construction time estimating section 22, a disk image to be used to construct the job program layout inputted from the manager 1.

The job operation environment constructing section 24 is a function block to construct, using the disk image determined by the in-use image determining section 23, a job operation environment on the computer 8 or 9 according to the job program layout inputted from the manager 1. The section 24 requests the image deployment manager 3 to deploy on the computer 8 or 9 the disk image determined by the section 23. The job operation environment constructing section 24 requests the program deployment manager 4 to uninstall unnecessary programs from the computer on which the disk image is deployed and to install lacking programs therein to thereby construct the job operation environment according to the job program layout inputted from the manager 1.

The backup image creating section 25 is a function block to back up, as a disk image, the job operation environment constructed by the constructing section 24. The section 25 requests the image deployment manager 3 for the backup operation to resultantly create the disk image 15 in the disk image storage 6.

The program layout table 27 is a table to keep therein a program layout for the disk image.

The image control table 28 is a table to keep therein information of disk images stored in the disk image storage 6.

The package control table 29 is a table to keep therein information regarding packages of the application programs 13 and the patch programs stored in the program package storage 7.

The deployment time history table 30 is a table to keep therein a period of time required to install, in a computer, application programs 13 and patch programs 14 stored in the storage 7 and a period of time required to restart the operating system after the installation. The table 30 also keeps an uninstallation time required to uninstall application programs 13 and patch programs 14 from the computer and a period of time required to restart the operating system after the uninstallation.

Figure 3:
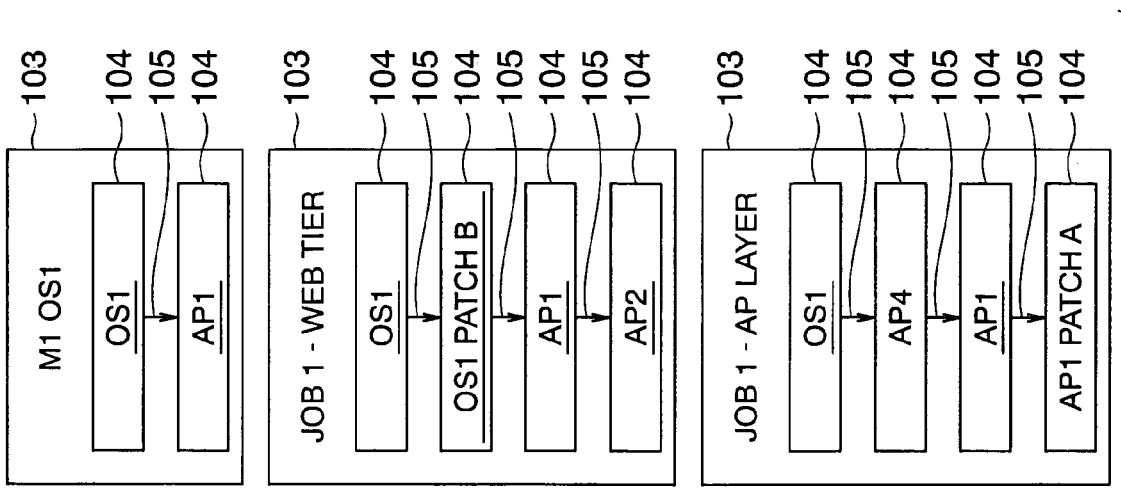
FIG. 3 is a data layout diagram showing a program layout table 27 of the first embodiment.

FIG. 3 shows in detail the program layout list 103 representing a program layout and the program layout table 27 having stored the contents of the list 103. In the list, program name nodes 104 are linked via an edge 105 with each other. In the order of the program name nodes 104, the programs are installed. The table 27 of FIG. 3 stores the contents of three program layout lists 103 shown in FIG. 3. The program layout table 27 includes three columns, i.e., a program layout name 100, a program name 101, and an installation order 102. The program layout name 100 is a name assigned to a program layout. The program name 101 is a name assigned to one application program 13 or one patch program 14 included in the program layout. The installation order 102 is a sequential number of the installation of the application program 13 or the patch program 14 represented by the program name 101. One record of the program layout table 27 corresponds to one program name node 104 in the program layout list 103.

FIG. 4 shows the image control table 28 in detail. The table 28 includes information of a disk image 15 in the disk image storage 6. The table 28 includes columns of a program layout name 110, an image file name 111, an in-use operating system (OS) 112, a computer type 113, a "deletable" field 114, a mean deployment time 115, and "number of deployments" 116. One record of the table 28 indicates information of one disk image 15. The program layout name 110 indicates a name of the program layout. Using the program layout name 110, it is possible to identify a disk image 15. By retrieving a program layout name 100 in the program layout table 27 using a program layout name 110, it is possible to obtain a program layout of a program included in the disk image 15 corresponding to the pertinent record. The image file name 111 indicates a file name of the disk image 15 corresponding to the pertinent record, the image 15 being stored in the disk image storage 6. The in-use OS 112 indicates a name of the operating system included in the disk image 15 corresponding to the pertinent record. The computer type 113 indicates a type of a computer on which the disk image 15 corresponding to the record can be deployed. The "deletable" field 114 indicates whether or not the file of the disk image 15 corresponding to the record is deletable when the capacity of the disk image storage 6 is insufficient. The mean deployment time 115 indicates a mean time from when the disk image 15 corresponding to the record is deployed on the computer to when the operating system and programs included in the disk image 15 are available. The number of deployments 116 indicates the number of deployments of the disk image 15 corresponding to the record on the computer.

FIG. 5 shows the package control table 29 in detail. One record of the table 29 indicates information of one application program 13 or one patch program 14 running on an operating system. The table 29 includes columns of a program name 120, an in-use OS 121, a package file name 122, an after-installation OS restart 123, a successively installable program 124, a patch object 125, an "uninstallable" field 126, an after-uninstallation OS restart 127, and a successively uninstallable program 128.

The program name 120 indicates a name of a program corresponding to the pertinent record. The in-use OS 121 indicates a name of an operating system on which the program corresponding to the record can operate. The package file name 122 indicates a file name of a file stored in the program package storage 7, the file including packaged programs which operate on the operating system indicated by the in-use OS 121.

The after-installation OS restart 123 indicates whether or not the operating system restart is required after installation of the program which is indicated by the program name 120 and which operates on the operating system indicated by the in-use OS 121.

The successively installable program 124 indicates a set of programs installable before the operating system is restarted after installation of the program which is indicated by the program name 120 and which operates on the operating system indicated by the in-use OS 121.

The patch object 125 is a name of an application program 13 as a patch object when the program which is indicated by the program name 120 and which operates on the operating system indicated by the in-use OS 121 is a patch program 14.

The "uninstallable" field 126 indicates whether or not the program which is indicated by the program name 120 and which operates on the operating system indicated by the in-use OS 121 is uninstallable after installation thereof.

The after-uninstallation OS restart 127 indicates whether or not the operating system restart is required after the program which is indicated by the program name 120 and which operates on the operating system indicated by the in-use OS 121 is uninstalled.

The successively uninstallable program 128 indicates a set of programs uninstallable before the operating system restart after the program which is indicated by the program name 120 and which operates on the operating system indicated by the in-use OS 121 is uninstalled.

FIG. 6 shows the deployment time history table 30 in detail. Each record of the table 30 includes information of one application program 13 or one patch program 14 operating on an operating system in a computer of a particular computer type. The table 30 includes columns of a program name 130, an in-use OS 131, a computer type 132, a mean installation time 133, a mean restart time at installation 134, a number of installations 135, a mean uninstallation time 136, a mean restart time at uninstallation 137, and a number of uninstallations 138.

The program name 130 indicates a name of a program corresponding to the record under consideration. The in-use OS 131 indicates an operating system on which the program corresponding to the record is operable.

The computer type 132 indicates a type of a computer in which the program corresponding to the record is installed or uninstalled.

The mean installation time 133 indicates a mean time required to install, on a computer indicated by the computer type 132, a program which is indicated by the program name and which operates on the operating system indicated by the in-use OS 131.

The mean restart time at installation 134 indicates a mean time from when the operating system is restarted after installation of the program which is indicated by the program name and which operates on the operating system indicated by the in-use OS 131 on the computer indicated by the computer type 132 to when the operating system becomes available.

The number of installations 135 indicates the number of operations conducted to install, on the computer indicated by the computer type 132, the program which is indicated by the program name and which operates on the operating system indicated by the in-use OS 131.

The mean uninstallation time 136 indicates a mean time required to uninstall a program indicated by the program name 130 from a computer indicated by the computer type 132, the program operating on an operating system indicated by the in-use OS 131.

The mean restart time at uninstallation 137 indicates a mean time from when the operating system is restarted after uninstallation of the program which is indicated by the program name and which operates on the operating system indicated by the in-use OS 131 from the computer indicated by the computer type 132 to when the operating system becomes available.

The number of uninstallations 138 indicates the number of operations conducted to uninstall, from the computer indicated by the computer type 132, the program which is indicated by the program name and which operates on the operating system indicated by the in-use OS 131.

FIG. 7 shows processing in the embodiment in which a job program layout is received from the manager 1 and then the information thus received is indicated to the image deployment manager 3 and the program deployment manager 4 to thereby construct the job operation environment on the computer 8 or 9.

In Step 1000, there is displayed an input user interface on the display 16 to input a program layout shown in FIG. 8. The manager 1 then inputs a program layout and a program layout name via the keyboard 17 and the mouse 18 to the input interface.

The input interface of FIG. 8 will be described. In FIG. 8, a window 180 is a window screen indicating the input user interface to edit the program layout. In an available program package list 182, a list of program names 120 and a list of in-use operating systems (OS) 121 included in the package control table 29 are displayed as program name nodes 104. In a program layout 181, as in the program layout list 103 of FIG. 3, there is presented a program layout including program name nodes 104 as nodes in the form of a one-directional list. When the manager 1 selects one of the program name nodes 104 from the available program package list 182 and pushes a node addition button 183, a node 104 of the selected program name is added as the last item of the list in the program layout 181. When the manager 1 selects one of the program name nodes 104 from the program layout 181 and pushes a node deletion button 184, a node 104 of the selected program name is deleted from the list 181. If a program name node 104 exists before and after the deleted node, the program name nodes 104 are linked by an edge with each other. When the manager 1 selects one of the program name nodes 104 from the program layout 181 and pushes a node forward button 185, the node 104 of the selected program name is exchanged with a node 104 of a program name before the selected program name in the order. When the manager 1 selects one of the program name nodes 104 from the program layout 181 and pushes a node backward button 186, the node 104 of the selected program name is exchanged with a node 104 of a program name after the selected program name in the order. The manager 1 inputs a program layout name in a text input box of a program layout name 187. When the manager 1 pushes a determination button 188, the input operation is completed.

In Step 1001, the list of programs in the program layout 181 inputted by the manager 1 in Step 1000 is obtained as list A and the program layout name 187 inputted by the manager 1 in Step 1000 is obtained as a program layout name of list A.

Step 1002 is a subroutine to obtain, from the disk images 15 stored in the disk image storage 6, a disk image 15 with which the job program layout inputted by the manager 1 in Step 1001 can be constructed. List A is passed as an argument to this subroutine, and set IU is received as a return value therefrom.

Step 1003 is a subroutine to estimate, using the disk image 15 obtained in Step 1002, a period of time required to construct the job program layout inputted by the manager 1. Set IU is passed as an argument to the subroutine, and set IU is received as a return value therefrom.

Step 1004 is a subroutine to determine, according to the construction time estimated in Step 1003, a disk image to be used when the job program layout inputted by the manager 1 is constructed. Set IU is passed as an argument to the subroutine, and an in-use program layout name, an in-use operating system, an in-use computer type, an in-use host name, an installation order list, and an uninstallation order list are received as a return value from the routine.

Step 1005 is a subroutine to construct, using the disk image determined in Step 1004, the job program layout inputted by the manager 1. An in-use program layout name, an in-use operating system, an in-use computer type, an in-use host name, an installation order list, and an uninstallation order list are passed as an argument to the subroutine.

Step 1006 is a subroutine to back up the disk image of the job operation environment constructed in Step 1005. List A, a program layout name of list A, an in-use operating system, an in-use computer type, and an in-use host name are passed as an argument to the subroutine.

Figure 9:
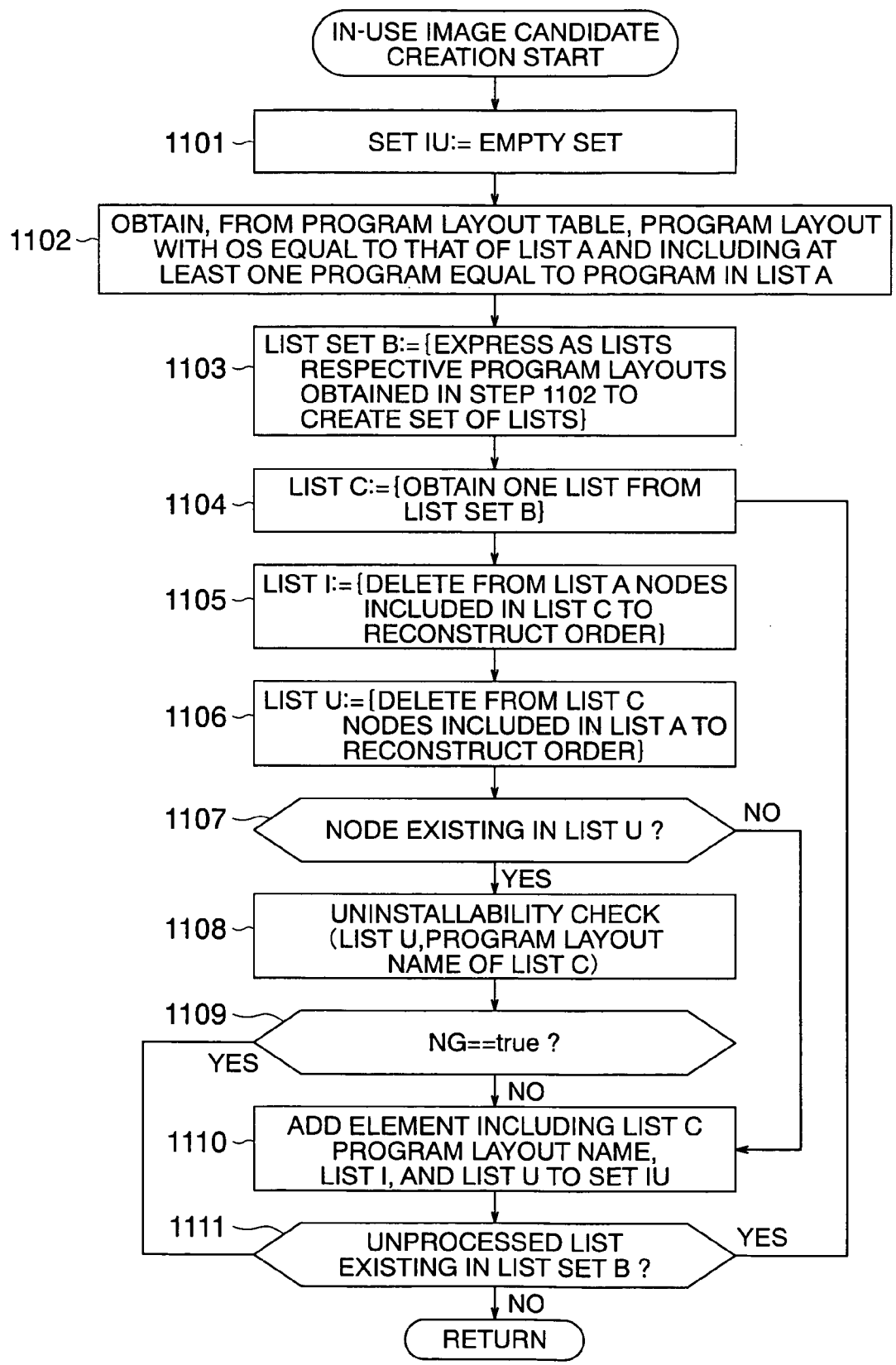
FIG. 9 is a flowchart showing a subroutine to retrieve a disk image available for the job operation environment construction in the first embodiment.

FIG. 9 shows in detail the subroutine called in Step 1002. The subroutine obtains, from the disk images kept in the disk image storage 6, a disk image with which the job program layout inputted by the manager 1 can be constructed to thereby create an in-use image candidate. List A is passed as an argument to the subroutine, and set IU is received as a return value therefrom.

In Step 1101, set IU is initialized as an empty set.

In Step 1102, from the program layout table 27, the subroutine obtains a program layout which includes as a node an operating system equal to that of the first node of list A and which includes at least one program indicated by a node other than the first node of list A.

In Step 1103, each program layout obtained in Step 1102 is represented in the form of a list according to the installation order using a program name as a node. As a result, the set of lists are obtained as list set B.

In Step 1104, one of the lists of list set B, which has not been obtained in Step 1104, is acquired from list set B to be designated as list C.

In Step 1105, the nodes included in list A are copied such that the nodes having the same program name as that included in list C are deleted from the copy. The list is then reconstructed according to the order of nodes in list A to resultantly obtain list I. The program indicated by the node in the list is the program to be added through the installation.

In Step 1106, the nodes included in list C are copied. From the copy, the nodes having the same program name as that included in list A are deleted. The obtained list is reconstructed according to the order of nodes in list A to obtain list U. The program indicated by the node in the list is the program to be deleted through the uninstallation.

In Step 1107, a check is made to determine whether or not list U includes any node to be processed. If list U includes a node, the process goes to Step 1108; otherwise, the process goes to Step 1110.

Step 1108 is a subroutine to determine whether or not the program with a program name indicated by a node included in list U is uninstallable. List U and a program layout name corresponding to list U are passed as an argument to the subroutine, and variable NG and list U are received as a return value from the subroutine.

In Step 1109, a check is made to determine whether or not variable NG as the return value of Step 1108 is "true". If the value is other than "true", the process goes to Step 1111; otherwise, the process goes to Step 1110.

In Step 1110, there is created an element including list I, list U, and a program layout name of a program layout indicated by list C. The element is added to set IU.

In Step 1111, a check is made to determine whether or not list set B includes any unprocessed list to be obtained in Step 1104. If there exists an unprocessed list, control goes to Step 1104; otherwise, control returns to the subroutine call source.

Figure 10:
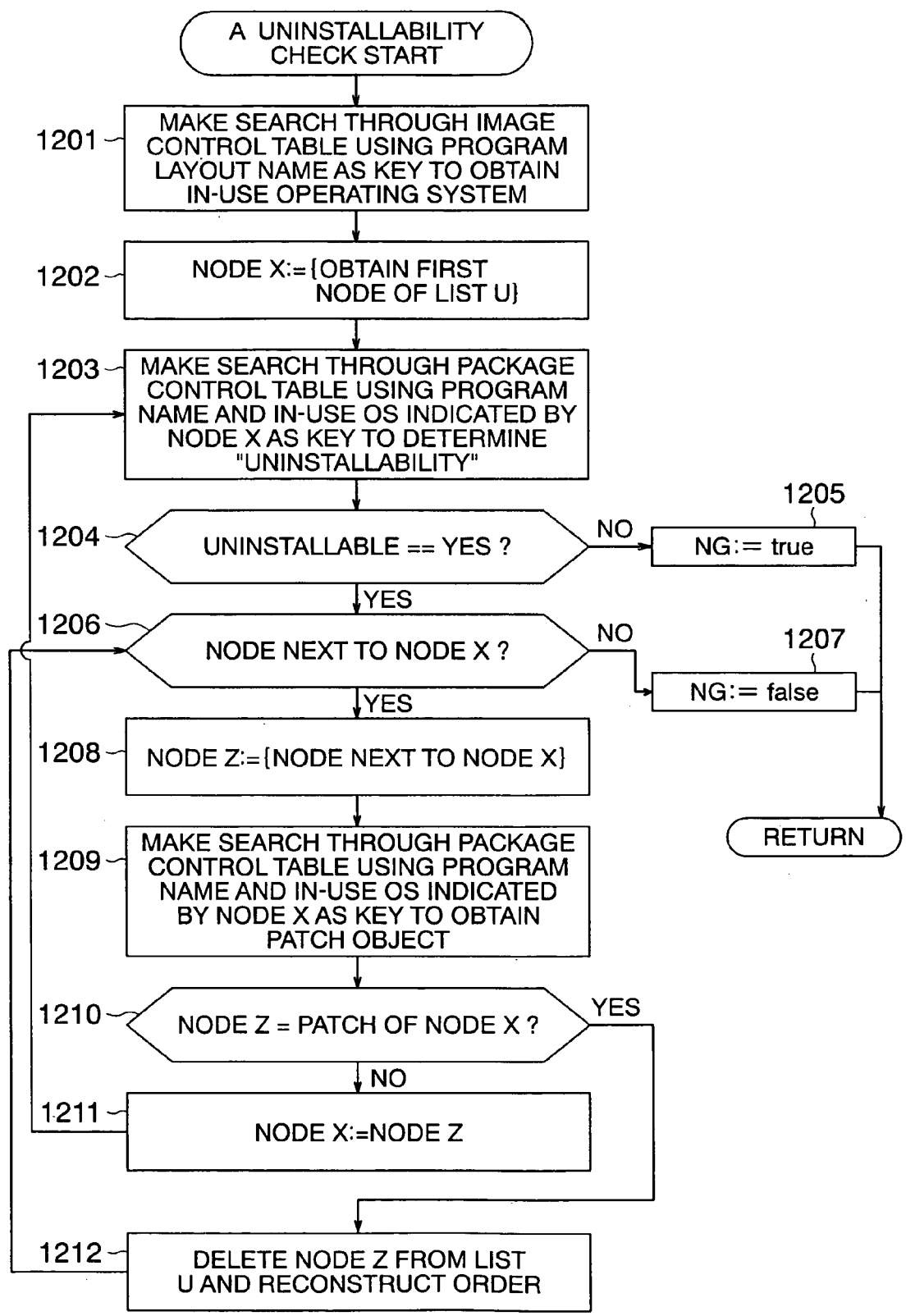
FIG. 10 is a flowchart showing a subroutine to determine whether or not an unnecessary program included in the disk image can be uninstalled in the first embodiment.

FIG. 10 shows in detail the subroutine called in Step 1108. The subroutine makes a check to determine whether or not a program indicated by a node contained in list U is uninstallable. The subroutine also conducts optimization to reduce the number of operations of uninstallation. Specifically, the program selects, from the patch programs 14 as objects of the uninstallation, the patch programs 14 for which application programs as patch objects are also to be uninstalled. When these application programs 13 are uninstalled, the patch programs 14 are also uninstalled. Therefore, these programs are removed from the installation objects. List U and a program layout name are passed as an argument to the subroutine, and variable NG and list U are received as a return value therefrom.

In Step 1201, using as a key the program layout name passed as an argument to the subroutine, a record retrieval operation is conducted through the image control table 28 to obtain an in-use operating system 112.

In Step 1202, the subroutine obtains as node X the first node in list U passed as an argument to the subroutine.

In Step 1203, using as a key a program name indicated by node X and the in-use operating system obtained in Step 1201, a search is made through the package control table 29 to obtain the "uninstallable" item 126.

In Step 1204, a check is made according to the contents of the "uninstallable" item obtained in Step 1203. If the item indicates "uninstallable", control goes to Step 1206; otherwise, control goes to Step 1205.

In Step 1205, the subroutine assigns "true" to variable NG and then returns to the subroutine call source.

In Step 1206, a check is made to determine whether or not a node exists after node X in list U. If such node exists, the process goes to Step 1208; otherwise, the process goes to Step 1207.

In Step 1207, the subroutine assigns "false" to variable NG and then returns to the subroutine call source.

In Step 1208, the subroutine obtains the node after node X in list U and designates the node as node z.

In Step 1209, using as a key a program name indicated by node Z and the in-use operating system obtained in Step 1201, the subroutine makes a retrieval through the package control table 29 to obtain the patch object 125.

In Step 1210, a check is made to determine whether or not the program indicated by node X exists in the patch objects obtained in Step 1209. If there exists the program, the process goes to Step 1212; otherwise, the process goes to Step 1211 in which a check is made to determine whether or not the program indicated by node Z is a patch for the program indicated by node X.

In Step 1211, the program indicated by node Z is designated as node X, and then control goes to Step 1203.

In Step 1212, the program indicated by node Z is deleted from list U and then the list is reconstructed according to the order of list U. Control the goes to Step 1206.

Figure 11:
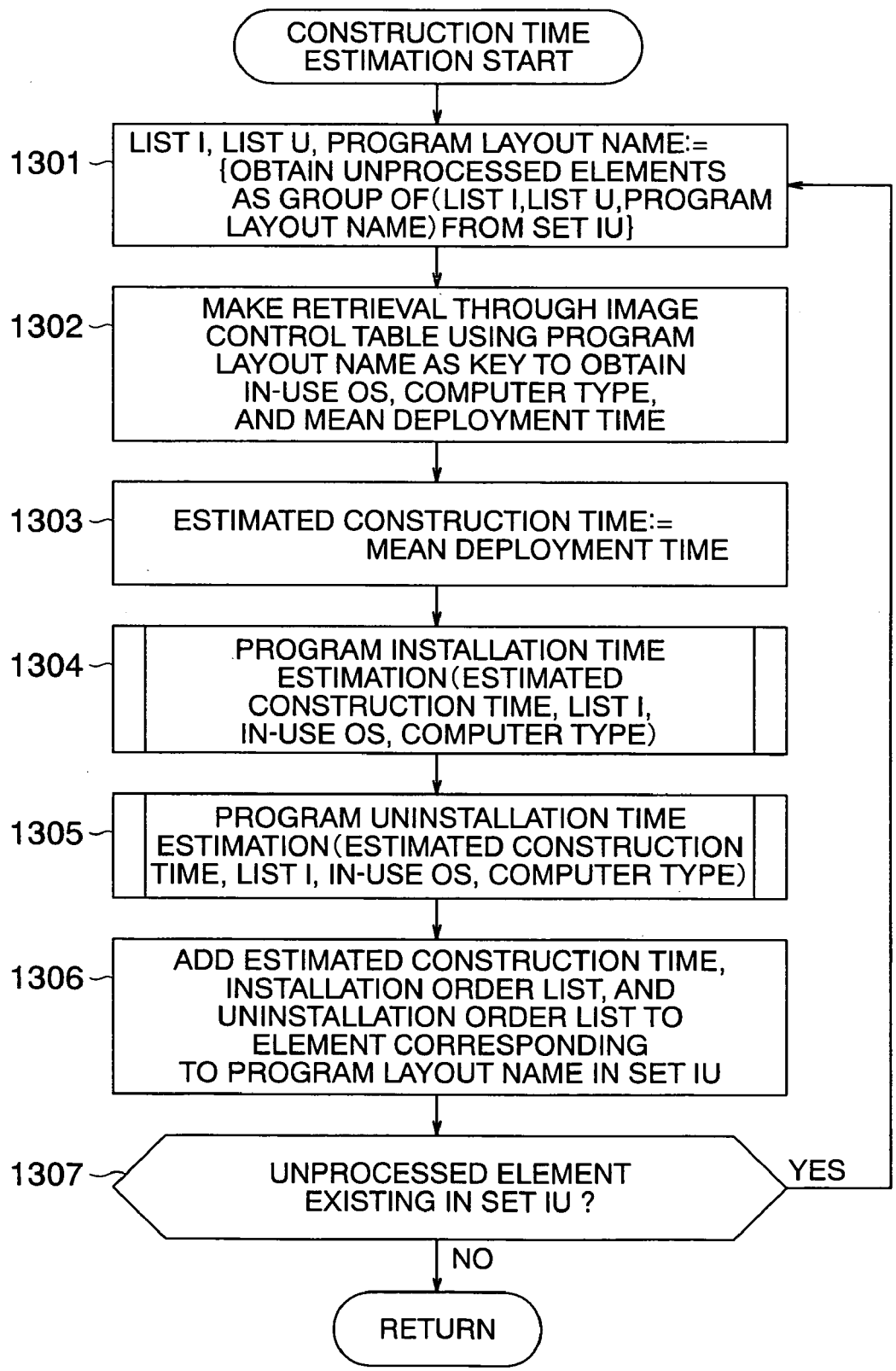
FIG. 11 is a flowchart showing a subroutine to obtain an estimated construction time required to construct a job operation environment in the first embodiment.

FIG. 11 shows in detail the subroutine called in Step 1003. The subroutine estimates, using the disk images obtained in Step 1002, the period of time required to construct the job program layout inputted from the manager 1. Set IU is passed as an argument to the subroutine, and set IU is received as a return value therefrom.

In Step 1301, the subroutine obtains one of the elements to be processed in Step 1301 and then extracts list I, list U, and a program layout name from the element.

In Step 1302, using as a key the program layout name obtained in Step 1301, a search is made through the image control table 28 to obtain the in-use OS 112, the computer type 113, and the mean deployment time 115.

In Step 1303, the mean deployment time 115 obtained in Step 1302 is assigned to the variable, i.e., the estimated construction time.

Step 1304 is a subroutine to estimate the program installation time. The estimated construction time, list I obtained in Step 1301, and the in-use OS and the computer type obtained in Step 1302 are passed as an argument to the subroutine. The estimated construction time and the installation order list are received as a return value therefrom.

Step 1305 is a subroutine to estimate the program uninstallation time. The estimated construction time, list I obtained in Step 1301, and the in-use OS and the computer type obtained in Step 1302 are passed as an argument to the subroutine. The estimated construction time and the uninstallation order list are received as a return value therefrom.

In Step 1306, the estimated construction time, the installation order list obtained in Step 1304, and the uninstallation order list obtained in Step 1305 are added to the element of set IU, the element including the program layout name obtained in Step 1301.

In Step 1307, a check is made to determine whether or not set IU includes any unprocessed element to be processed in Step 1301. If an unprocessed element exists, control goes to Step 1301; otherwise, control returns to the subroutine call source.

Figure 12:
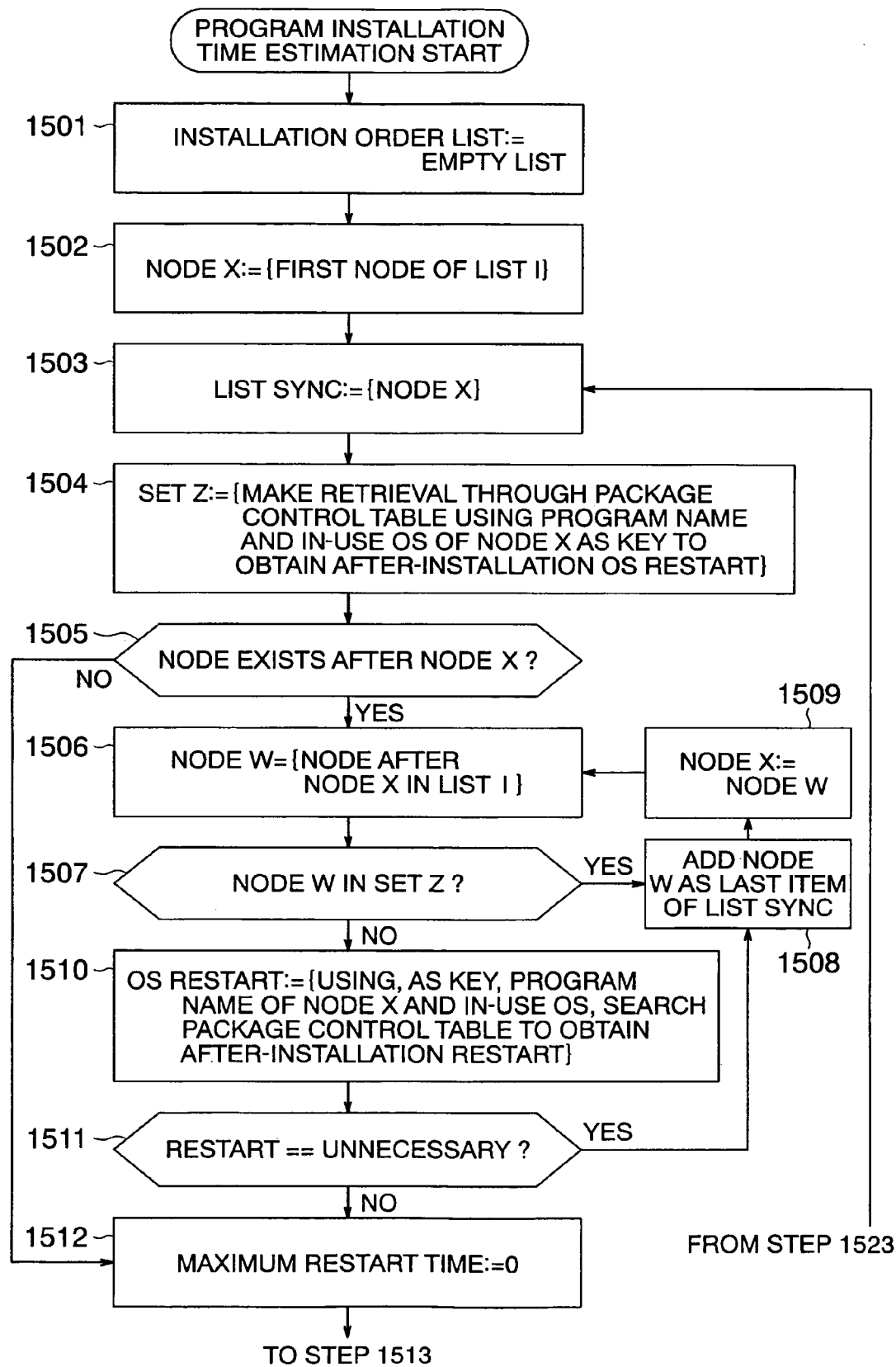
FIG. 12 is a flowchart showing a first-half section of a subroutine to obtain a period of time required to install programs in the estimated construction time.
Figure 13:
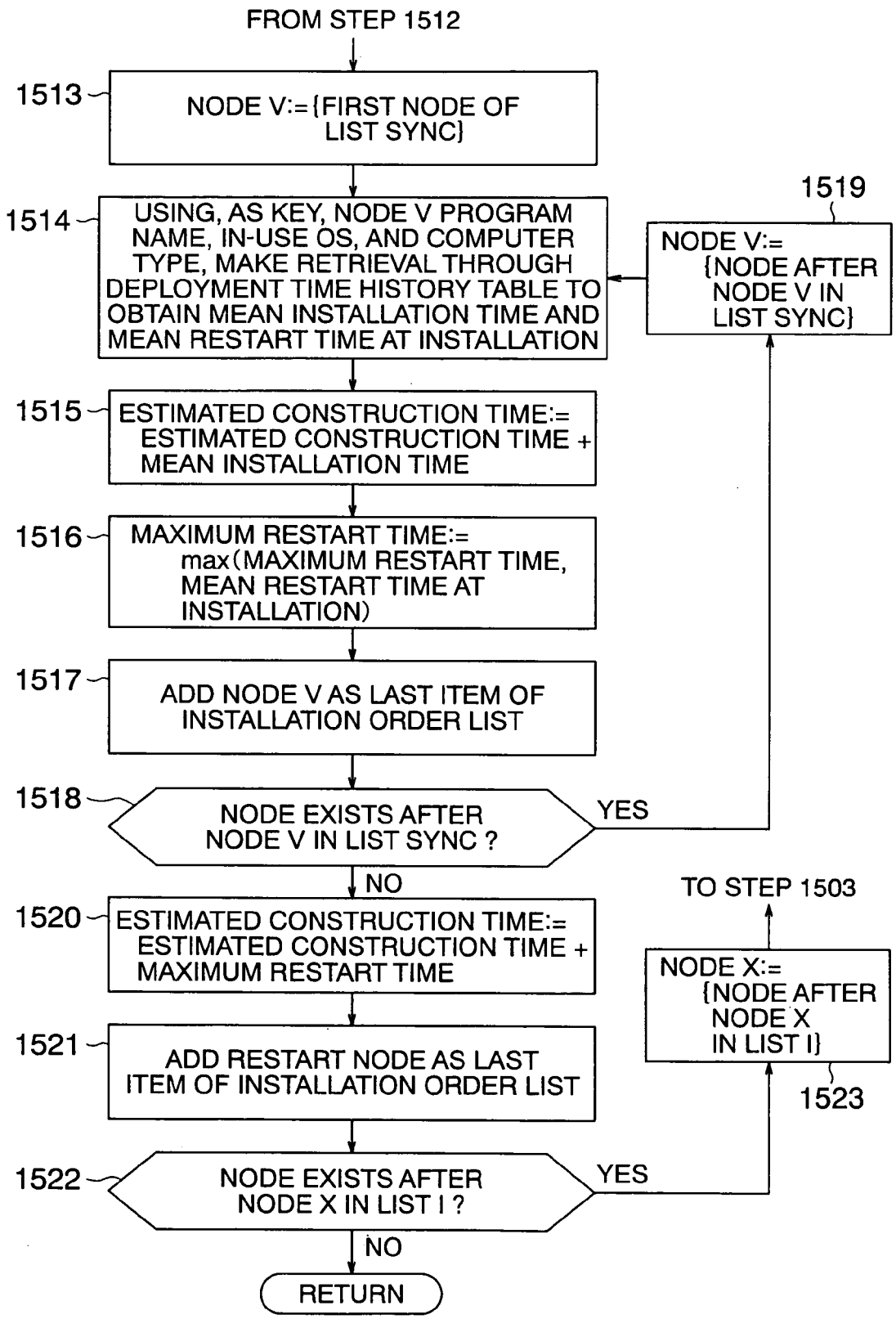
FIG. 13 is a flowchart showing a second-half section of the subroutine to obtain the period of time required to install programs.

FIGS. 12 and 13 show in detail the subroutine called in Step 1304. The subroutine estimates the period of time required to install an additional program when the job program layout inputted by the manager 1 is constructed. Also, the subroutine creates an installation order list indicating an order of the program installation and the operating system restart. The estimated construction time, list I, the in-use operating system, and the computer type are passed as an argument to the subroutine. The estimated construction time and the installation order list are received as a return value therefrom.

In Step 1501, the installation order list is initialized as an empty list.

In Step 1502, the first node of list I is obtained to be designated as list X.

In Step 1503, list SYNC is established to contain only list X. The contents of list SYNC form a list of programs successively installable before the restart.

In Step 1504, using as key the program name of node X and the in-use OS, a search is made through the package control table 29 to obtain a successively installable program 124 to create set Z including the obtained program names.

In Step 1505, a check is made to determine whether or not a node exists after node X in list I. If such node exists, the process goes to Step 1507; otherwise, the process goes to Step 1512.

In Step 1506, the node after node X in list I is obtained to be set as node W.

In Step 1507, a check is made to determine whether or not the program name indicated by list W exists in set Z. If the program name exists, the process goes to Step 1508; otherwise, the process goes to Step 1510.

In Step 1508, node W is added as the last item of list SYNC.

In Step 1509, node W is set as node X.

In Step 1510, using as a key the program name indicated by node X and the in-use operating system, a search is made through the package control table 29 to obtain the after-installation OS restart 123.

In Step 1511, a check is made to determine whether or not the value of the after-installation OS restart 123 obtained in Step 1510 is "unnecessary". If the value is "unnecessary", the process goes to Step 1508; otherwise, the process goes to Step 1512.

In Step 1512, the maximum restart time is set to "0".

In Step 1513, the first node of list SYNC is obtained to be set as node V.

In Step 1514, using as a key the program indicated by node V, the in-use OS, and the computer type, a search made through the deployment time history table 30 to obtain the mean installation time 133 and the mean restart time at installation 134.

In Step 1515, the mean installation time obtained in Step 1514 is added to the estimated construction time.

In Step 1516, the maximum restart time is compared with the means restart time at installation obtained in Step 1514 to set the larger one thereof as the maximum restart time.

In Step 1517, the program name indicated by node V is added as the last item of the installation order list.

In Step 1518, a check is made to determine whether or not a node exists after node V in list SYNC. If such node exists, the process goes to Step 1519; otherwise, the process goes to Step 1520.

In Step 1519, the node after node V is obtained from list SYNC to be set as node V.

In Step 1520, the maximum restart time is added to the estimated construction time.

In Step 1521, the restart node is added as the last item in the installation order list.

In Step 1522, a check is made to determine whether or not a node exists after node X in list I. If such node exists, the process goes to Step 1523; otherwise, the process returns to the subroutine call source.

In Step 1523, the node after node X is obtained from list I to be set as node X.

Figure 14:
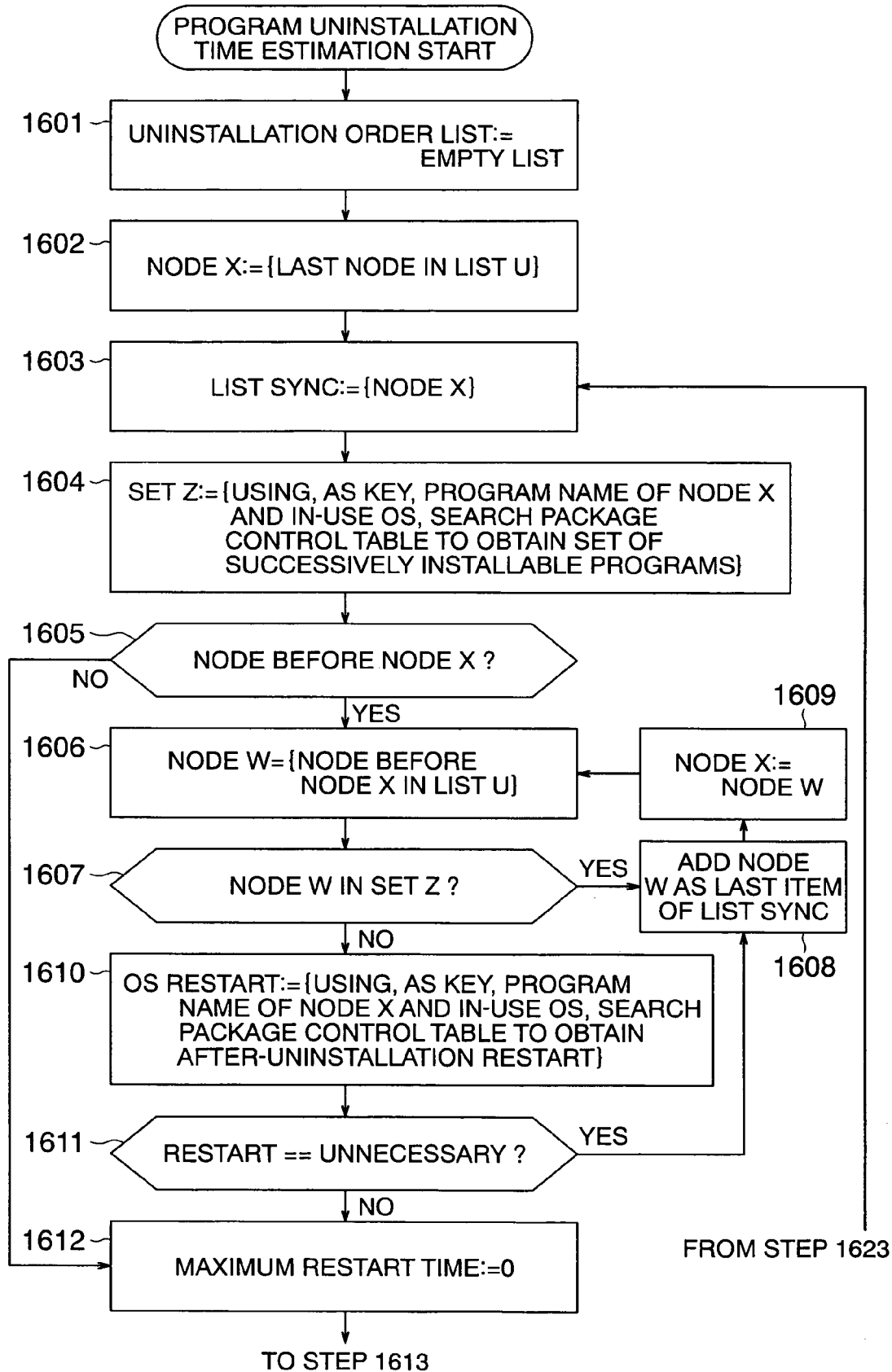
FIG. 14 is a flowchart showing a first-half section of a subroutine to obtain a period of time required to uninstall programs in the estimated construction time.
Figure 15:
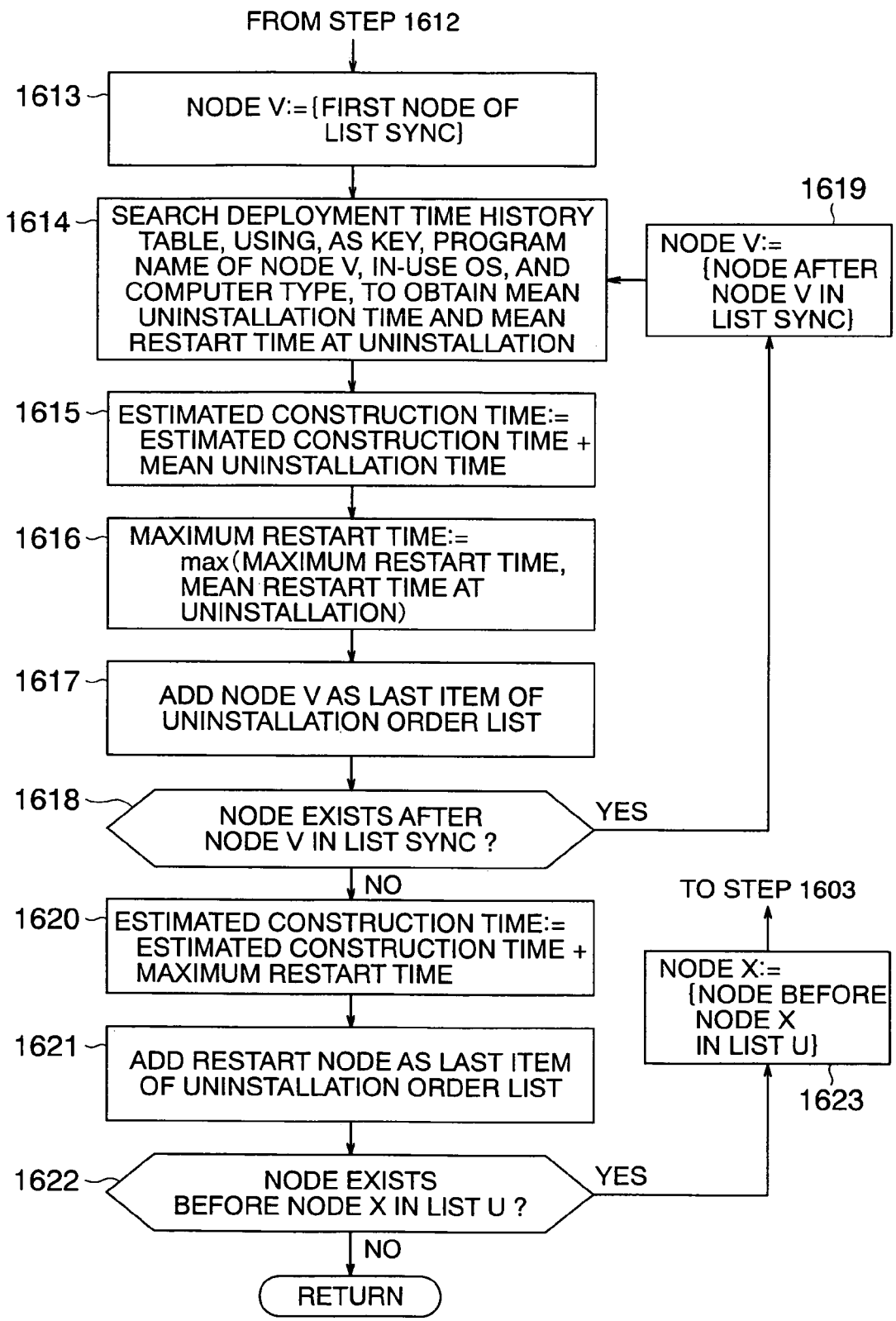
FIG. 15 is a flowchart showing a second-half section of the subroutine to obtain the period of time required to uninstall programs.

FIGS. 14 and 15 show in detail the subroutine called in Step 1305. The subroutine estimates the time required to uninstall a program to be deleted when the job program layout inputted by the manager 1 is constructed. The subroutine also creates an uninstallation order list indicating the order of the program uninstallation and the operation system restart. The estimated construction time, list U, the in-use OS, and the computer time are passed as an argument to the subroutine. The estimated construction time and the uninstallation order list are received as a return value from the subroutine.

In Step 1601, the uninstallation order list is initialized as an empty list.

In Step 1602, the last node of list U is obtained to be set as list X.

In Step 1603, list SYNC is initialized to include only list X. The contents of list SYNC form a list of programs which can be successively uninstalled before the restart.

In Step 1604, using as key the program name of node X and the in-use OS, a search is made through the package control table 29 to obtain a successively uninstallable program 128 to form set Z including the obtained program names.

In Step 1605, a check is made to determine whether or not a node exists before node X in list U. If such node exists, the process goes to Step 1607; otherwise, the process goes to Step 1612.

In Step 1606, the node before node X is obtained from list U to be set as node W.

In Step 1607, a check is made to determine whether or not the program name indicated by list W exists in set Z. If the program name exists therein, the process goes to Step 1608; otherwise, the process goes to Step 1610.

In Step 1608, node W is added as the last item in list SYNC.

In Step 1609, node W is set as node X.

In Step 1610, using as key the program name of node X and the in-use OS, a search is made through the package control table 29 to obtain the after-uninstallation OS restart 127.

In Step 1611, a check is made to determine whether or not the value of the after-installation OS restart obtained in Step 1610 is "unnecessary". If the value is "unnecessary", the process goes to Step 1608; otherwise, the process goes to Step 1612.

In Step 1612, the maximum restart time is set to "0".

In Step 1613, the first node of list SYNC is obtained to be set as node V.

In Step 1614, using as a key the program indicated by node V, the in-use OS, and the computer type, a search is made through the deployment time history table 30 to obtain the mean uninstallation time 136 and the mean restart time at uninstallation 137.

In Step 1615, the mean uninstallation time obtained in Step 1614 is added to the estimated construction time.

In Step 1616, the maximum restart time is compared with the means restart time at uninstallation obtained in Step 1614 to set the larger one thereof as the maximum restart time.

In Step 1617, the program name indicated by node V is added as the last item in the uninstallation order list.

In Step 1618, a check is made to determine whether or not a node exists after node V in list SYNC. If such node exists, the process goes to Step 1619; otherwise, the process goes to Step 1620.

In Step 1619, the node after node V is obtained from list SYNC to be set as node V.

In Step 1620, the maximum restart time is added to the estimated construction time.

In Step 1621, the restart node is added as the last item in the uninstallation order list.

In Step 1622, a check is made to determine whether or not a node exists before node X in list U. If such node exists, the process goes to Step 1623; otherwise, the process returns to the subroutine call source.

In Step 1623, the node before node X is obtained from list U to be set as node X.

Figure 16:
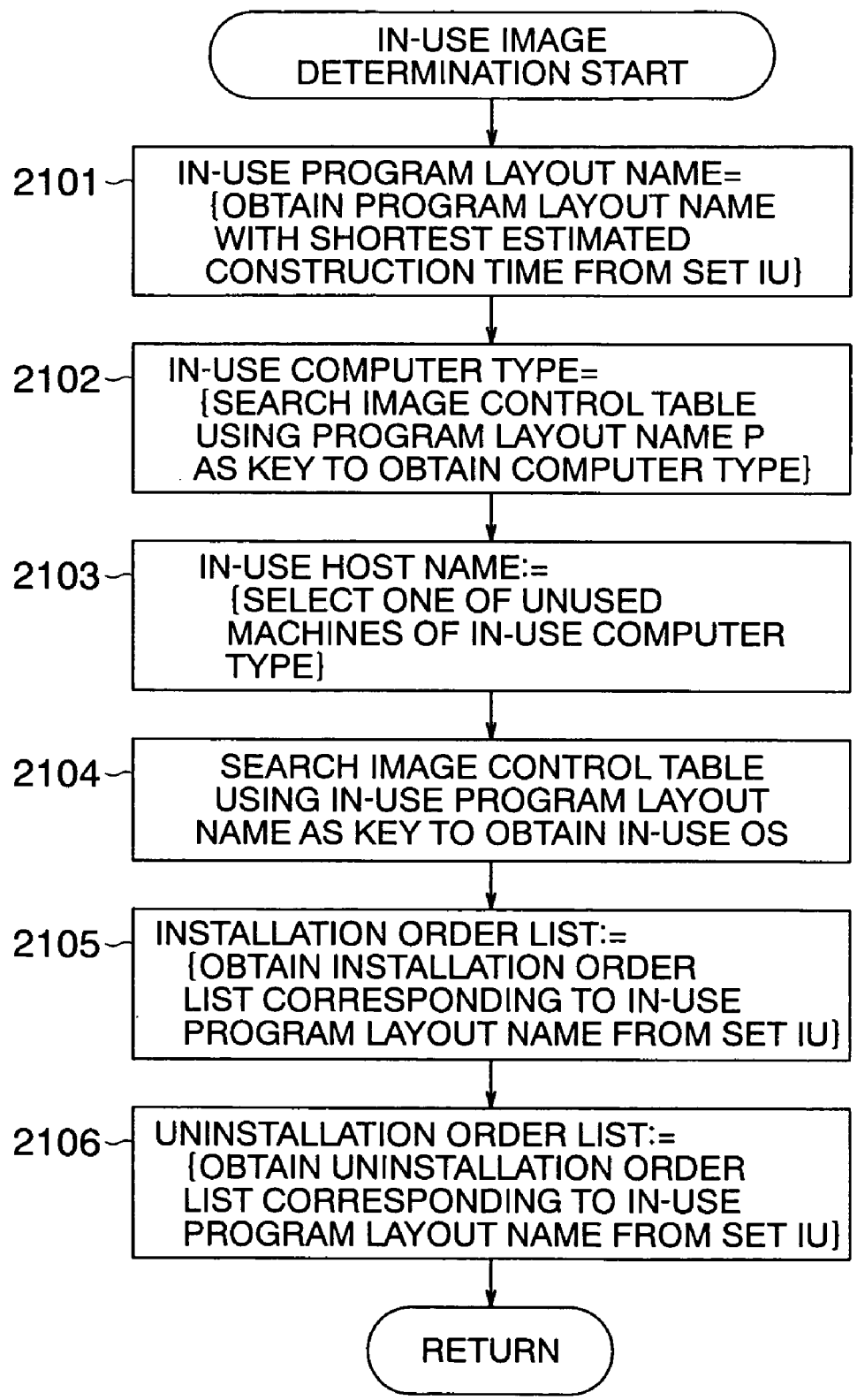
FIG. 16 is a flowchart showing a subroutine to determine a disk image to be used in the first embodiment.

FIG. 16 shows in detail the subroutine called in Step 1004. The subroutine determines one of the disk images obtained in Step 1002 for the construction of the job program layout inputted from the manager 1. In the embodiment, the subroutine selects the disk image having the smallest value of the estimated construction time obtained in Step 1003. Set IU is passed as an argument to the subroutine. The in-use program layout name, the in-use OS, the in-use computer type, the installation order list, and the uninstallation order list are received as a return value from the subroutine.

In Step 2101, one of the elements of set IU which has the shortest construction time is obtained to acquire therefrom a program layout name. The program layout name is set as the in-use program layout name.

In Step 2102, using the in-use program layout name as a key, a search is made through the image control table 28 to obtain the computer type 113, which is then set as the in-use computer type.

In Step 2103, the subroutine selects one of the machines of the in-use computer type which is not used in the job to obtain the host name of the machine. The host name is then set as the in-use host name.

In Step 2104, using the in-use program layout name as a key, a search is made through the image control table 28 to obtain the in-use OS 112, which is set as the in-use operating system.

In Step 2105, an installation order list is acquired from the element obtained in Step 2101.

In Step 2106, an uninstallation order list is acquired from the element obtained in Step 2101.

Figure 17:
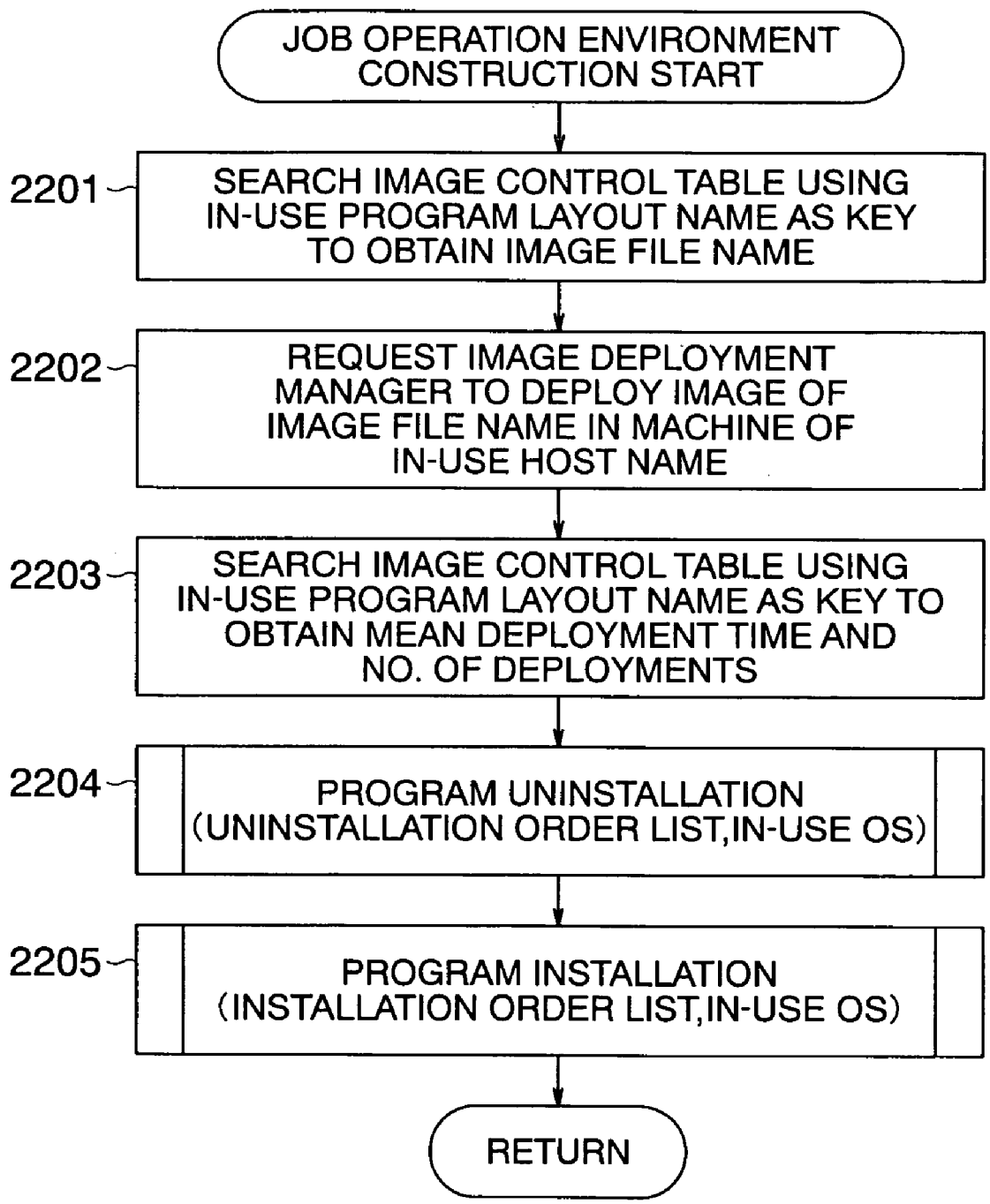
FIG. 17 is a flowchart showing processing to construct a job operation environment by deploying a disk image in the first embodiment.

FIG. 17 shows in detail the subroutine called in Step 1005. The subroutine constructs the job program layout inputted from the manager 1 by use of the disk image obtained in Step 1004. The in-use program layout name, the in-use OS, the in-use computer type, the in-use computer name, the installation order list, and the uninstallation order list are passed as an argument to the subroutine.

In Step 2201, using the in-use program layout name as a key, a search is made through the image control table 28 to obtain the image file name.

In Step 2202, the subroutine requests the image deployment manager 3 to deploy the image file name obtained in Step 2201 in the computer indicated by the in-use host name.

In Step 2203, the subroutine obtains the deployment time from when the request is issued to the image deployment manager 3 in Step 2202 to when the operating system becomes available on the computer indicated by the in-use host name. Using the in-use program layout name as a key, a search is made through the image control table 28 to update the mean deployment time 115 and the number of deployments 116 in the obtained record. The mean deployment time 115 is updated according to an expression of "(old mean deployment time×old number of deployments+new deployment time obtained through the current operation)/(old number of deployments+1)". The number of deployments 116 is updated using an expression of "old number of deployments+1".

Step 2204 is a subroutine to uninstall an unnecessary program. An uninstallation order list, an in-use OS, an in-use computer type, and an in-use host name are passed as an argument to the subroutine.

Step 2205 is a subroutine to install a required program. An installation order list, an in-use OS, an in-use computer type, and an in-use host name are passed as an argument to the subroutine. It can also be considered that Step 2203 is skipped to avoid the update of the contents of the image control table 28.

Figure 18:
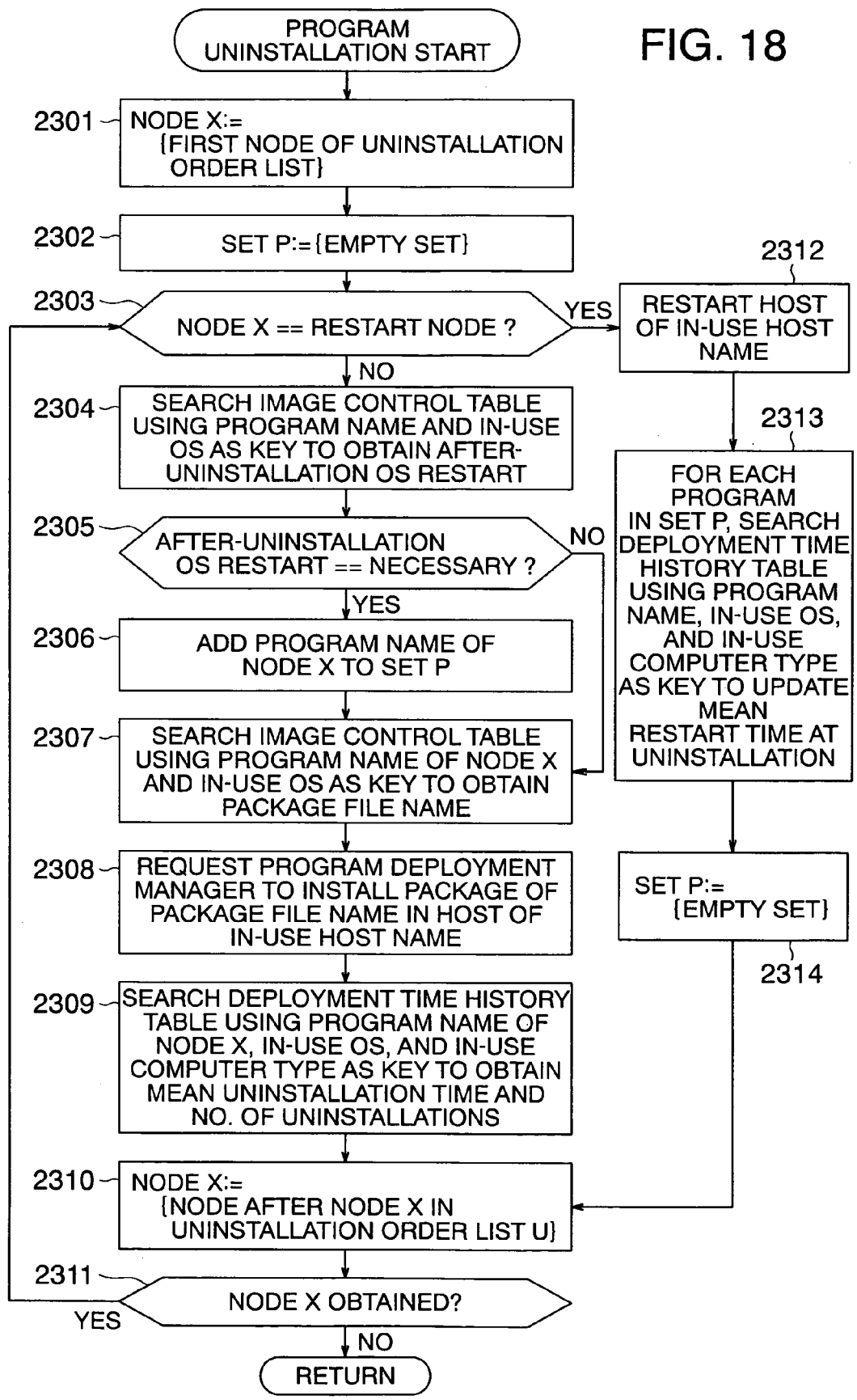
FIG. 18 is a flowchart showing a subroutine to uninstall an unnecessary program in the first embodiment.

FIG. 18 shows in detail the subroutine called in Step 2204. The subroutine uninstalls unnecessary programs in the sequence of the uninstallation order list. The uninstallation order list, the in-use OS, the in-use computer type, and the in-use host name are passed as an argument to the subroutine.

In Step 2301, the first node is obtained from the uninstallation order list to be set as node X.

In Step 2302, set P is initialized as an empty set.

In Step 2303, a check is made to determine whether or not node X is a restart node. If node X is a restart node, the process goes to Step 2310; otherwise, the process goes to Step 2304.

In Step 2304, the subroutine searches the package control table 29 using as a key the program name indicated by node X and the in-use OS to obtain the after-uninstallation OS restart 127.

In Step 2305, a check is made to determine whether or not the after-uninstallation OS restart 127 obtained in Step 2304 is necessary. If necessary, the process goes to Step 2308; otherwise, the process goes to Step 2307.

In Step 2306, node X is added to set P.

In Step 2307, using as a key the program name indicated by node X and the in-use OS, a search is made through the package control table 29 to obtain the package file name 122.

In Step 2308, the subroutine requests the program deployment manager 4 to uninstall, from the host of the in-use host, the package having the package file name obtained in Step 2307.

In Step 2309, the subroutine obtains the uninstallation time which is a period of time required to uninstall the program in Step 2308. Using as key the program name indicated by node X, the in-use OS, and the in-use computer type, a search is made through the deployment time history table 30 to update the mean uninstallation time 136 and the number of uninstallations 138 of the retrieved record. The mean uninstallation time 136 is updated according to an expression of "(mean uninstallation time of the record×no. of uninstallations of the record+uninstallation time obtained through the current operation)/(no. of uninstallations of the record+1)". The number of uninstallations 138 is updated using an expression of "no. of uninstallations of the record+1".

In Step 2310, the node after node X is obtained from the uninstallation order list to be set as node X.

In Step 2311, a check is made to determine whether or not node X has been obtained in Step 2310. If the node has been obtained, the process goes to Step 2303; otherwise, the process returns to the subroutine call source.

In Step 2312, the subroutine requests the program deployment manager 4 to restart the host of the in-use host name.

In Step 2313, the subroutine obtains the restart time which is a period of time required to restart the host of the in-use host name. Using as key the program name indicated by node X, the in-use OS, and the in-use computer type, a search is made through the deployment time history table 30 to update the mean restart time at uninstallation 137 of the retrieved record. The mean restart time at uninstallation 137 is updated according to an expression of "(mean restart time at uninstallation of the record×(no. of uninstallations of the record−1)+restart time obtained through the current operation)/(no. of uninstallations of the record)".

In Step 2314, set P is initialized to an empty set. In this connection, it can also be considered that both or one of Steps 2309 and 2313 are or is skipped to avoid the update of the contents of the deployment time history table 30.

Figure 19:
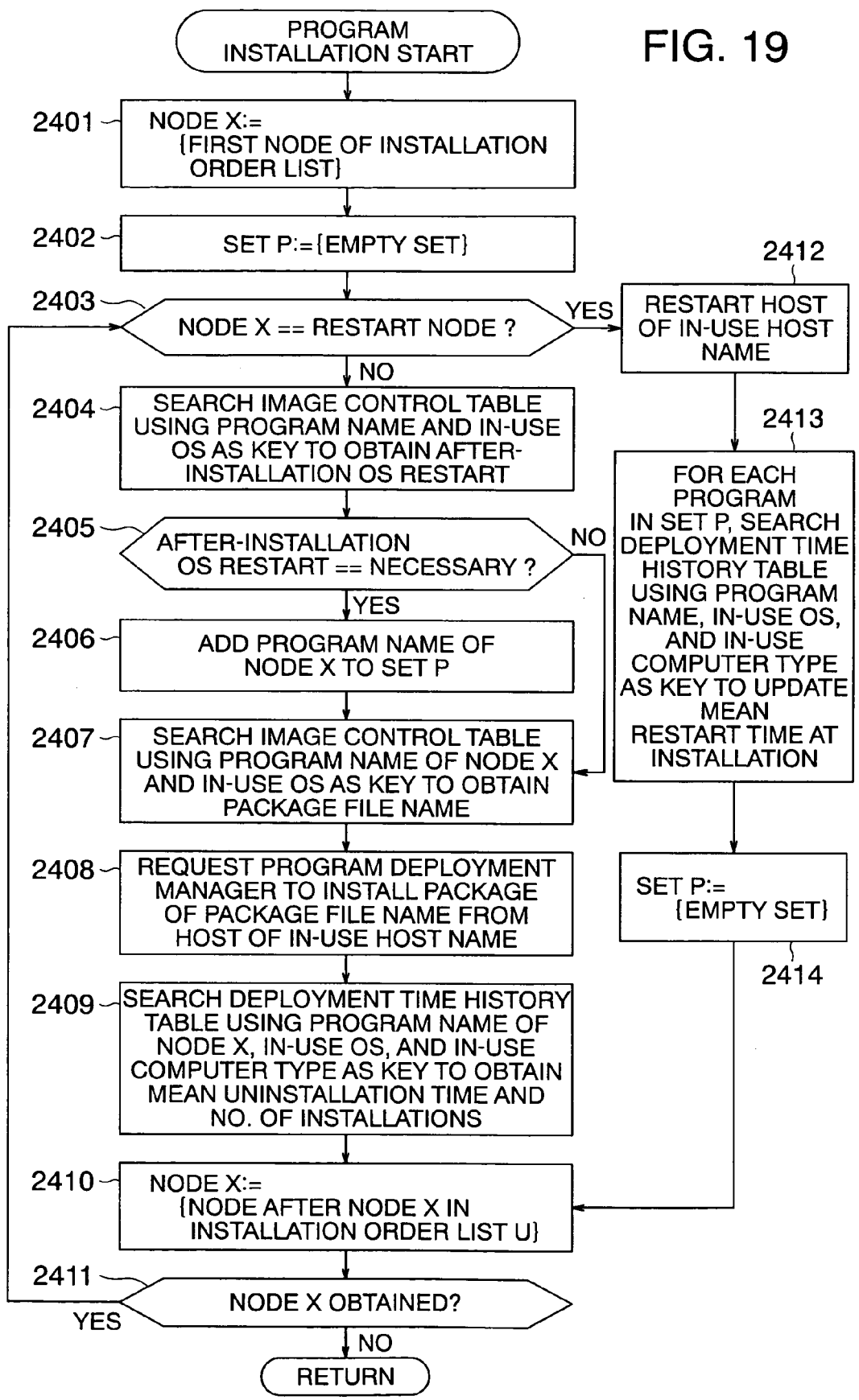
FIG. 19 is a flowchart showing a subroutine to install a lacking or necessary program in the first embodiment.

FIG. 19 shows in detail the subroutine called in Step 2205. The subroutine installs required programs or lacking programs in the sequence of the installation order list. The installation order list, the in-use OS, the in-use computer type, and the in-use host name are passed as an argument to the subroutine.

In Step 2401, the first node is obtained from the installation order list to be set as node X.

In Step 2402, set P is initialized as an empty set.

In Step 2403, a check is made to determine whether or not node X is a restart node. If node X is a restart node, the process goes to Step 2410; otherwise, the process goes to Step 2404.

In Step 2404, the subroutine searches the package control table 29 using as a key the program name indicated by node X and the in-use OS to resultantly obtain the after-installation OS restart 123.

In Step 2405, a check is made to determine whether or not the after-installation OS restart obtained in Step 2404 is necessary. If necessary, the process goes to Step 2408; otherwise, the process goes to Step 2407.

In Step 2406, node X is added to set P.

In Step 2407, using as a key the program name indicated by node X and the in-use OS, a search is made through the package control table 29 to obtain the package file name 122.

In Step 2408, the subroutine requests the program deployment manager 4 to install, in the host of the in-use host, the package having the package file name obtained in Step 2307.

In Step 2409, the subroutine obtains the installation time which is a period of time required to install the program in Step 2408. Using as a key the program name indicated by node X, the in-use OS, and the in-use computer type, a search is made through the deployment time history table 30 to update the mean installation time 133 and the number of installations 135 of the retrieved record. The mean installation time 133 is updated according to an expression of "(mean installation time of the record×no. of installations of the record+installation time obtained through the current operation)/(no. of installations of the record+1)". The number of installations 135 is updated using an expression of "no. of installations of the record+1".

In Step 2410, the node after node X is obtained from the installation order list to be set as node X.

In Step 2411, a check is made to determine whether or not node X has been obtained in Step 2410. If the node has been obtained, the process goes to Step 2403; otherwise, the process returns to the subroutine call source.

In Step 2412, the subroutine requests the program deployment manager 4 to restart the host of the in-use host name.

In Step 2413, the subroutine obtains the restart time which is a period of time required to restart the host of the in-use host name. Using as a key the program name indicated by node X, the in-use OS, and the in-use computer type, a search is made through the deployment time history table 30 to update the mean restart time at installation 134 of the retrieved record. The mean restart time at installation 134 is updated according to an expression of "(mean restart time at installation of the record×(no. of installations of the record−1)+restart time obtained through the current operation)/(no. of installations of the record)".

In Step 2414, set P is initialized to an empty set.

In this connection, it can also be considered that both or one of Steps 2409 and 2413 are or is skipped to avoid the update of the contents of the deployment time history table 30.

Figure 20:
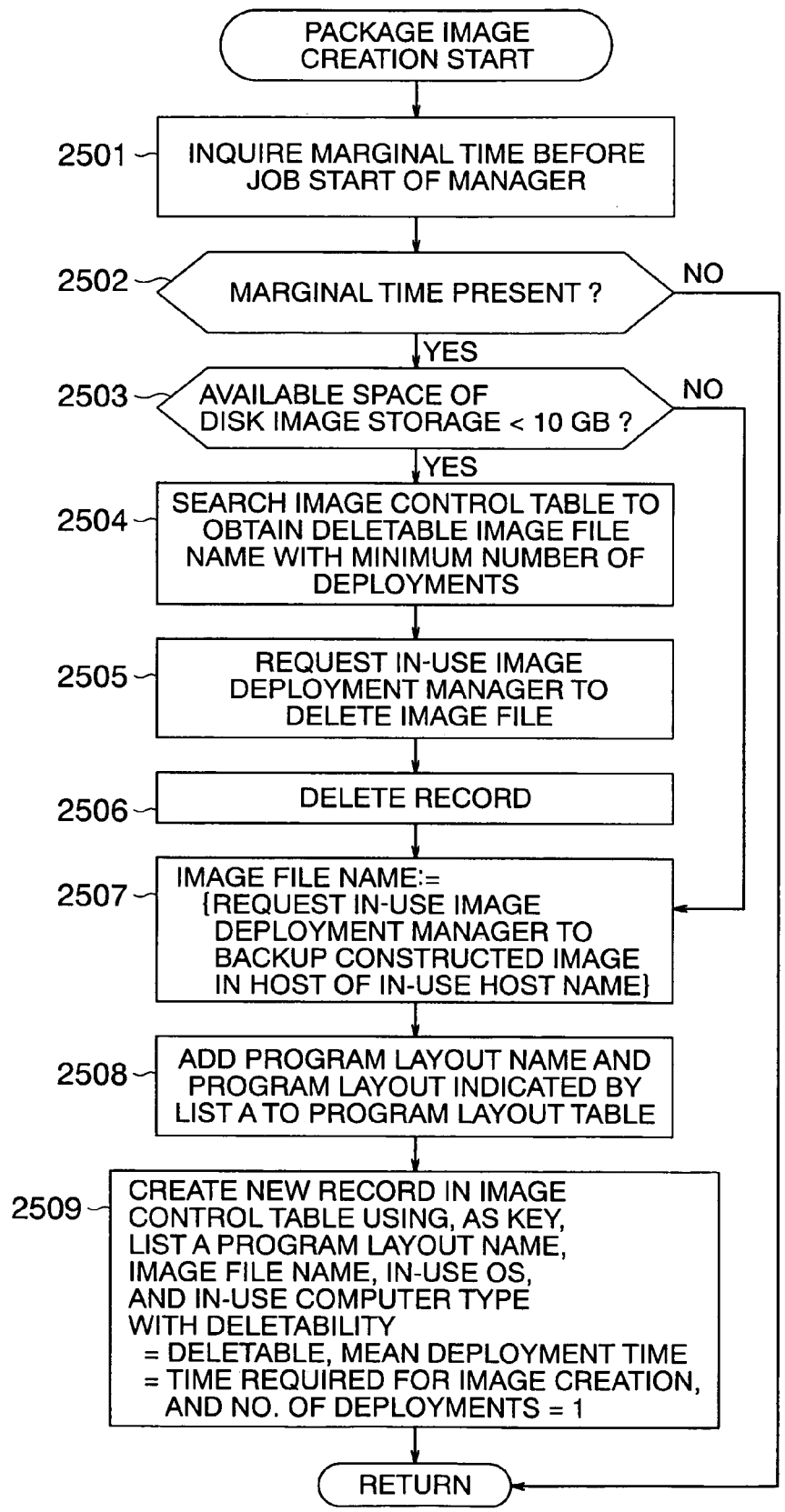
FIG. 20 is a flowchart showing a subroutine to back up a disk image of a job operation environment constructed in the first embodiment.

FIG. 20 shows in detail the subroutine called in Step 1006. The subroutine produces a backup image of the disk image of the job operation environment constructed in Step 1005. List A, the program layout name of list A, the in-use OS, and the in-use computer type are passed as an argument to the subroutine.

In Step 2501, the subroutine creates an input user interface for the manger to inquire whether or not a marginal time exists before the job start. Thereafter, the subroutine receives a response inputted by the manager.

In Step 2502, if the response received in Step 2501 is "yes", i.e., such marginal time exists", the process goes to Step 2503; otherwise, the process returns to the subroutine call source.

In Step 2503, the subroutine obtains an available capacity of the disk image storage 6. If the available capacity is less than ten gigabytes (GB), the process goes to Step 2504; otherwise, the process goes to Step 2507.

In Step 2504, a search is made through the image control table 28 to obtain an image file name of which the number of deployments takes the minimum value. If a plurality of such image file names are obtained, one of the image file names is selected in a random fashion.

In Step 2505, the subroutine requests the image deployment manager 3 to delete, form the disk image storage 6, the image file name obtained in Step 2504.

In Step 2506, the record retrieved in Step 2504 is deleted from the image control table 28.

In Step 2507, the subroutine requests the image deployment manager 3 to back up the contents of the initiation disk of the host with the in-use host name, i.e., to create a disk image in the disk image storage 6. The subroutine obtains the file name of the backup disk image as the image file name. The subroutine obtains, as the image creation time, a period of time from when the request is sent to the manager 3 to when the image file is created.

In Step 2508, the subroutine stores the program layout name and the program layout indicated by list A in the program layout table 27.

In Step 2509, using the program layout name of list A, the image file name obtained in Step 2507, the in-use OS, and the in-use computer type, a record is added to the image control table 28 with deletability=deletable, mean deployment time=image creation time obtained in Step 2507, and no. of deployment=0.

It is also possible that the subroutine detects, before Step 2509, a computer which is a computer of in-use computer type and which is not being used by any job. The subroutine deploys in the computer the disk image created in Step 2507 to obtain the period of time required for the deployment such that the value of the mean deployment time of the image control table 28 is updated in Step 2509 to the period of time required for the deployment.

Figure 21:
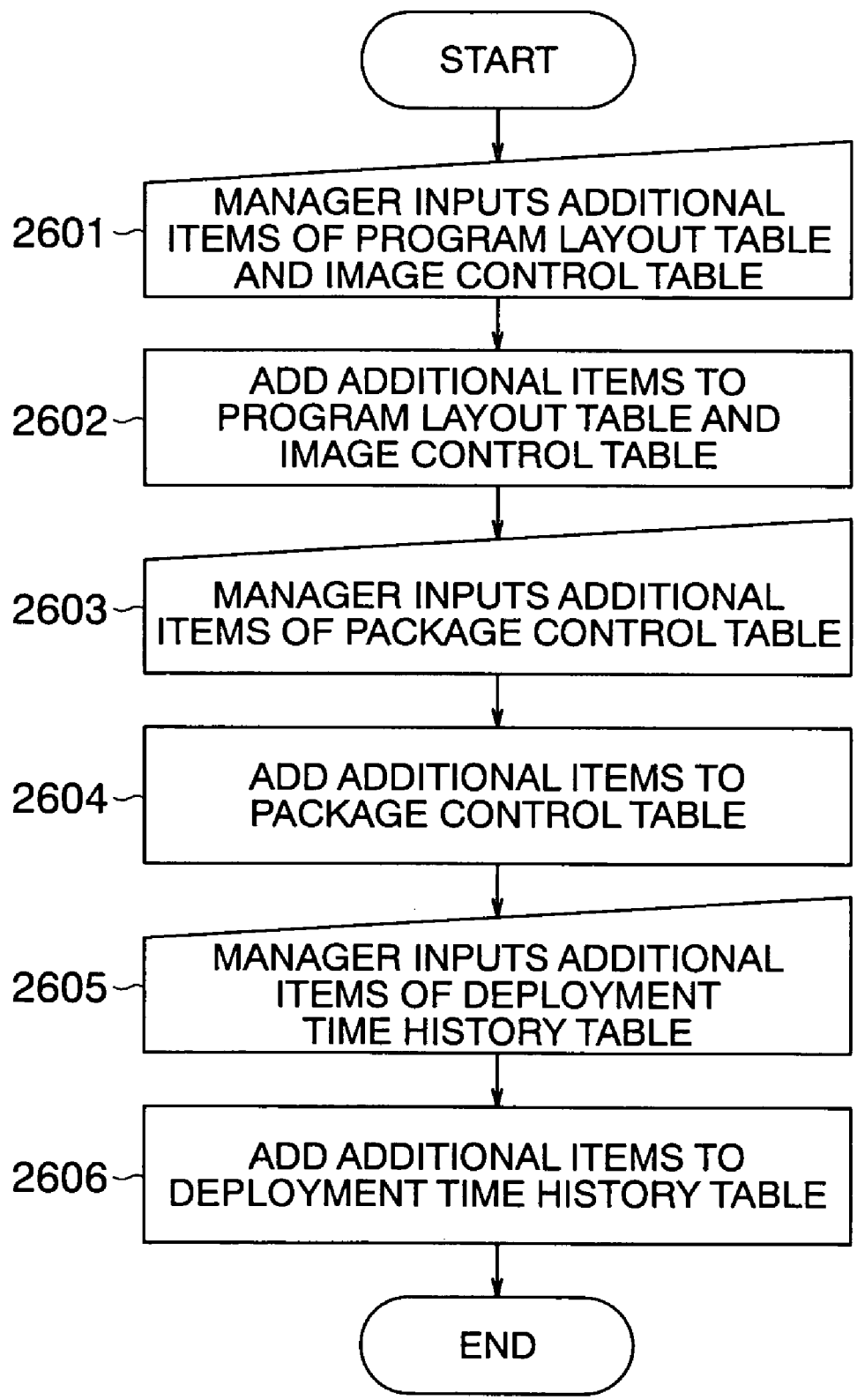
FIG. 21 is a flowchart showing processing for a manager 1 to add items of the contents in the program layout table 27, the image control table 28, the package control table 29, and the deployment time history table 30 in the first embodiment.

FIG. 21 shows processing in which the manager 1 adds items to the program layout table 27, the image control table 27, the package control table 28, and the deployment time history table 30. The user input/output section 20 executes the processing.

Figure 22:
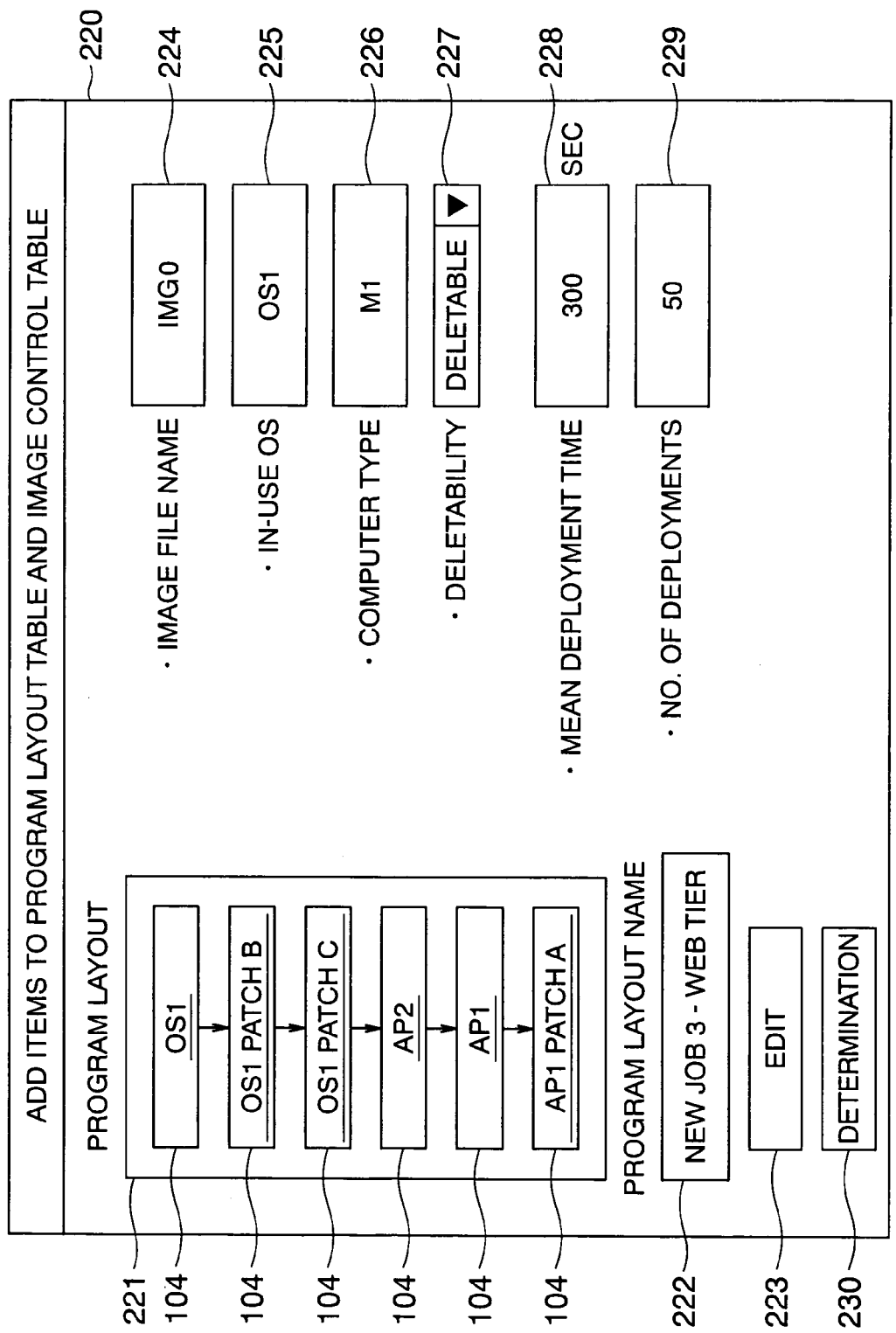
FIG. 22 is a view of a screen image showing an input user interface for the manager 1 to add items of the contents in the program layout table 27 and the image control table 28 in the first embodiment.

In Step 2601, the input user interface to add items to the program control table 27 and the package control table 28 is displayed as shown in FIG. 22. The manager 1 inputs items using the keyboard 17 and the mouse 18 to be added to the tables 27 and 28. A window 220 of FIG. 22 is a window screen as the input user interface to add items to the tables 27 and 28. Description will now be given of FIG. 22.

A program layout 221 represents, like the program layout list 103 of FIG. 3, a program layout in a one-directional list including nodes, i.e., nodes 104 of program names. A program layout name 222 is a name of the program layout indicated by the program layout 221. When the manager 1 pushes an edit button 223, the input user interface shown in FIG. 8 is displayed. When the manager completely inputs items in the input user interface, the contents of the program layout 181 of FIG. 8 are reflected on the program layout 221 of FIG. 22, and the item of the program layout 187 of FIG. 8 is reflected on the program layout 222 of FIG. 22. The contents and operation of the input user interface displayed when the manager 1 pushes the edit button 223 are almost the same as those described in conjunction with Step 1000.

An image file name 224, an in-use OS 225, a computer type 226, a mean deployment time 228, and a no. of deployments 229 are text input boxes. The manager 1 inputs a file name of a disk image stored in the disk image storage 6 in the image file name 224, an operating system name contained in the disk image in the in-use OS 225, a computer type of a computer in which the disk image can be deployed in the computer type 226, a period of time required to deploy the disk image in the computer in the mean deployment time 228, and the number of deployments of the disk image in the computer in the number of deployments 229.

A "deletability" 227 is a list down box to select "deletable" or "not deletable". When the empty or available area of the disk image storage 6 becomes small, the manager 1 selects to input "deletable" or "not deletable" as information whether or not it is possible to delete an image file.

When the manager 1 pushes the determination button 230, the input operation is completed.

In Step 2602, the additional items inputted by the manager 1 in Step 2601 for the program layout table 27 and the image control table 28 are added to the tables 27 and 28. The program layout 181 and the program layout name 187 of FIG. 8 are stored in the program layout table 27.

For the image control table 28, each record is created by moving the items from FIG. 22 to the image control table 28 as below. The program layout name 222 is moved to the program layout name 110, the image file name 224 is moved to the image file name 111, the in-use OS 225 is moved to the in-use OS 112, the computer type 226 is moved to the in-use computer type 113, the deletability 227 is moved to the deletability 114, the mean deployment time 228 is moved to the mean deployment time 115, and the no. of deployments 229 is moved to the no. of deployment 116.

Figure 23:
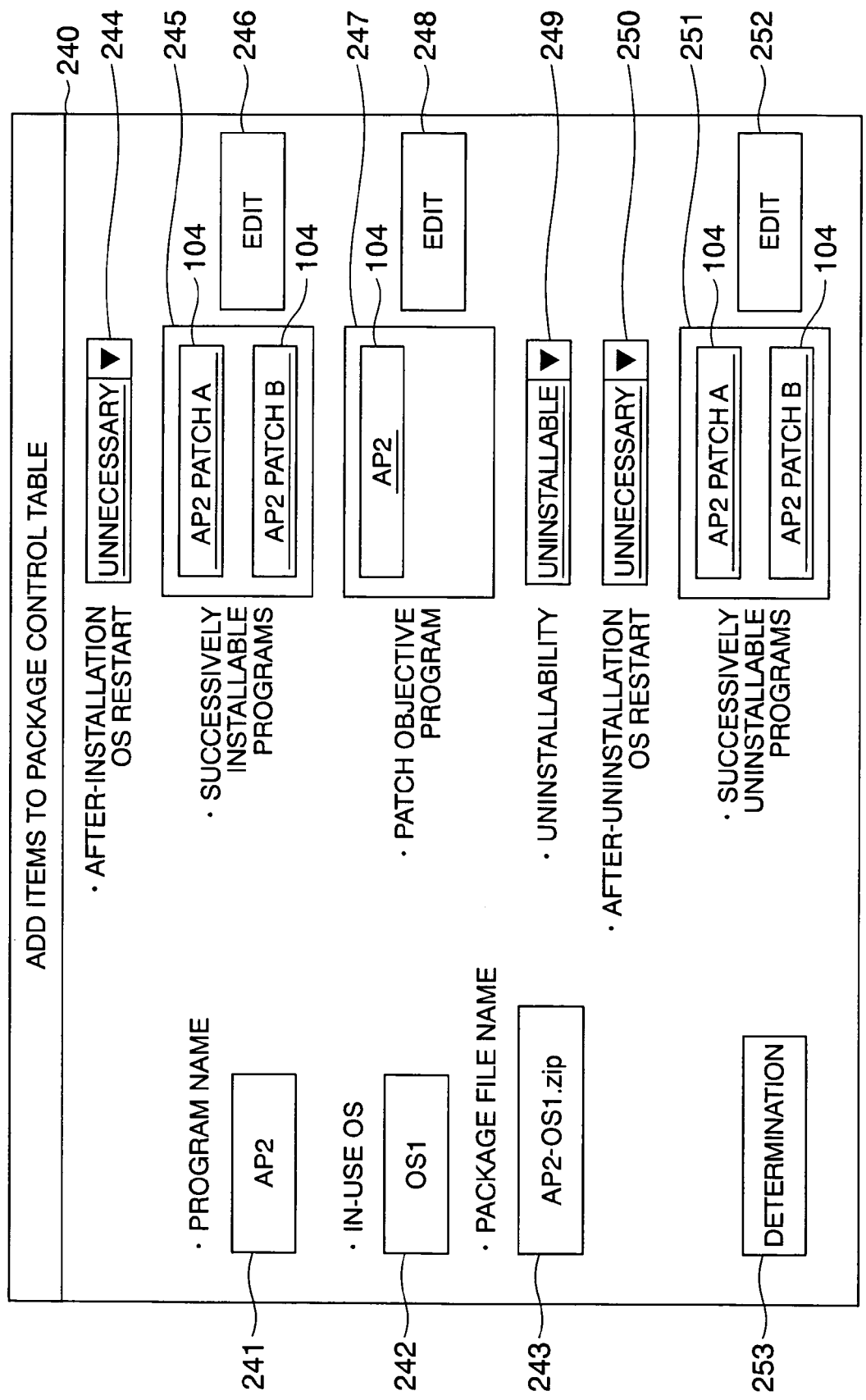
FIG. 23 is a view of a screen image showing an input user interface for the manager 1 to add items of the contents in the package control table 29 in the first embodiment.

In Step 2603, the input user interface of FIG. 23 to add items to the package control table 29 is displayed on the display 16. The manager 1 inputs additional items for the table 29 using the keyboard 17 and the mouse 18. The window 240 shown in FIG. 23 is a window screen of the input user interface to add items to the table 29. Description will now be given of FIG. 23.

A program name 241, an in-use OS 242, and a package file name 243 are text input boxes. The manager 1 inputs a program name in the program name 241, a name of an operating system with which the program becomes operable in the in-use OS 242, and a file name of a packaged program stored in the program package storage 7 in the package file name 243.

An after-installation OS restart 244 and an uninstallability 249 are list down boxes to select "necessary" or "unnecessary". An after uninstallation OS restart 250 is also a list down box to select "yes" or "no".

The manager 1 selects to input "necessary" or "unnecessary" in the after-installation OS restart 244 as information whether or not it is necessary to restart the operating system after the program installation. The manager 1 selects "yes" or "no" in the uninstallability 249 as information whether or not the program is uninstallable. The manager 1 selects to input "necessary" or. "unnecessary" in the after uninstallation OS restart 250 as information whether or not it is necessary to restart the operating system after the program uninstallation.

The successively installable program 245 is represented as a set of program name nodes 104. When the manager 1 pushes the edit button 246, the input user interface is displayed as shown in FIG. 8. When the manager 1 completely inputs items in the input user interface, a set of nodes 104 of program names in the program layout 181 of FIG. 8 are reflected on the successively installable program 245. If the program layout 181 of FIG. 8 does not include any node, the successively installable program 245 is empty. The contents and operation of the user input interface displayed when the manager 1 pushes the edit button 246 are almost the same as for those described in conjunction with Step 1000.

The patch objective program 247 is represented as a node 104 of zero or one program name. When the manager 1 pushes the edit button 248, the input user interface is displayed as shown in FIG. 8. When the manager 1 completely inputs items in the input user interface, the first node of the program layout 181, i.e., the node 104 of a program name is reflected in the patch objective program 247. If the program layout 181 of FIG. 8 does not include any node, the patch objective program 247 is empty. The contents and operation of the user input interface displayed when the manager 1 pushes the edit button 248 are almost the same as for those described in conjunction with Step 1000.

The successively uninstallable program 251 is represented as a set of program name nodes 104. When the manager 1 pushes the edit button 252, the input user interface is displayed as shown in FIG. 8. When the manager 1 completely inputs items in the input user interface, a set of nodes 104 of program names in the program layout 181 of FIG. 8 are reflected on the successively uninstallable program 251. If the program layout 181 of FIG. 8 does not include any node, the successively uninstallable program 251 is empty. The contents and operation of the user input interface displayed when the manager 1 pushes the edit button 252 are almost the same as for those described in conjunction with Step 1000.

When the manager 1 pushes the determination button 253, the input operation is completed.

In Step 2604, the additional items inputted by the manager 1 for the package control table 29 in Step 2603 are added to the table 29. Specifically, the respective additional items are set to the associated items of the package control table 29 for an associated new record. The program name 241 is moved to the program name 120, the in-use OS 242 is moved to the in-use OS 121, the package file name 243 is moved to the package file name 122, the after-installation OS restart 244 is moved to the after-installation OS restart 123, the set of program names contained in the successively installable program 245 is moved to the after-installation successively installable program 124, the program name of the patch objective program 247 is moved to the patch object 125, the set of program names contained in the uninstallability 249 is moved to the "uninstallable" field 126, the after-uninstallation OS restart 250 is moved to the after-uninstallation OS restart 127, and the successively uninstallable program 251 is moved to the successively uninstallable program 128.

Figure 24:
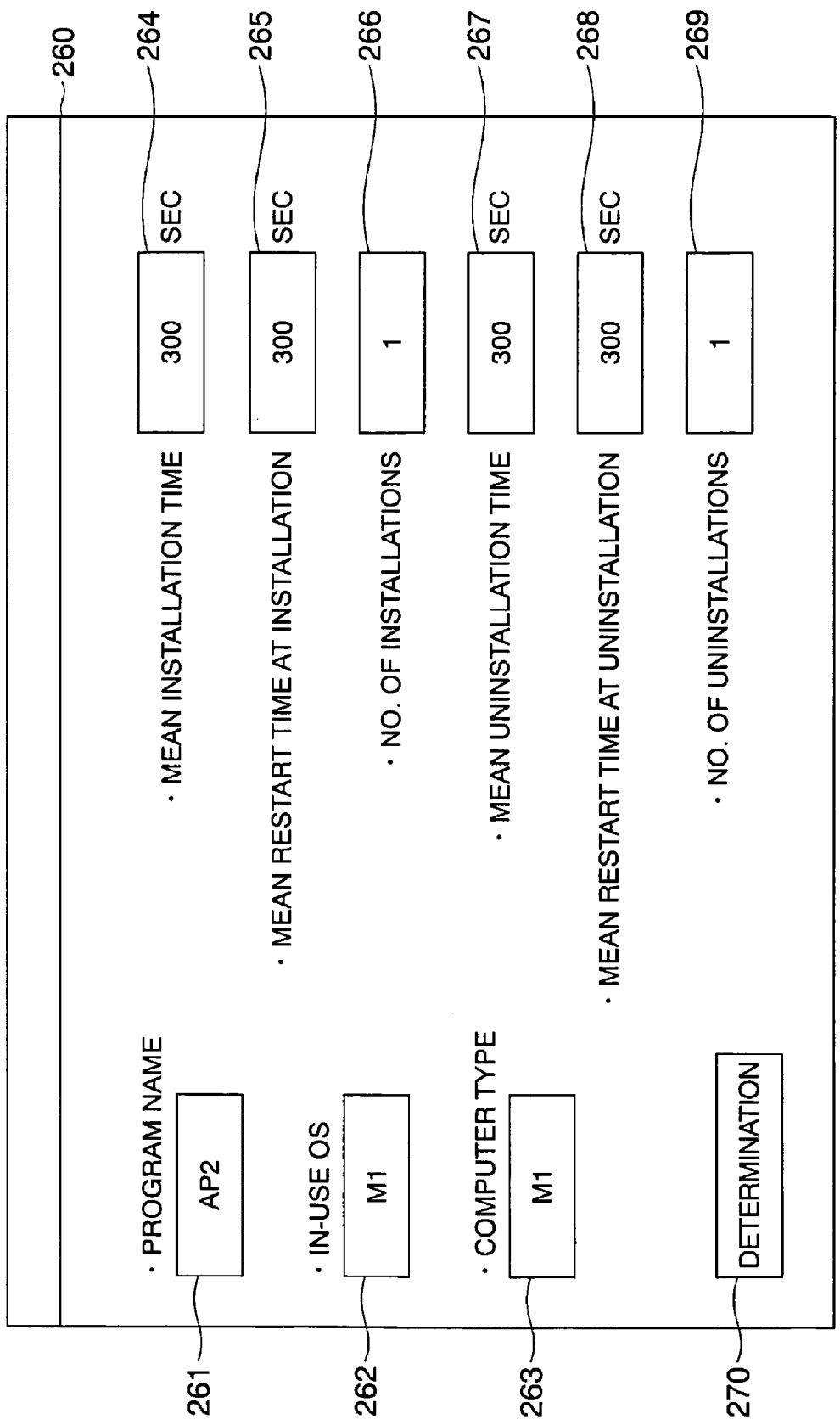
FIG. 24 is a view of a screen image showing an input user interface for the manager 1 to add items of the contents in the deployment time history table 30 in the first embodiment.

In Step 2605, the input user interface of FIG. 24 to add items to the deployment time history table 30 is displayed on the display 16. The manager 1 inputs additional items for the table 30 using the keyboard 17 and the mouse 18. The window 260 shown in FIG. 24 is a window screen of the input user interface to add items to the table 30. Description will now be given of FIG. 24.

A program name 261, an in-use OS 262, a mean installation time 264, a mean restart time at installation 265, a no. of installations 266, a mean uninstallation time 267, a mean restart time at uninstallation 268, and a no. of uninstallations 269 are text input boxes. The manager 1 inputs a name of a program in the program name 261, a name of operating system with which the program becomes operable in the in-use OS 262, a type of a computer in which the program can be deployed in the computer type 263, a mean installation time of the program in the mean installation time 264, a mean time required for the OS restart after the program installation in the mean restart time at installation 265, the number of installations of the program in the no. of installations 266, a mean uninstallation time of the program in the mean uninstallation time 267, a mean time required for the OS restart after the program uninstallation in the mean restart time at uninstallation 268, and the number of uninstallations of the program in the no. of uninstallations 269.

When the manager 1 pushes the determination button 270, the input operation is completed.

In Step 2606, the additional items inputted by the manager 1 for the deployment time history table 30 in Step 2605 are added to the table 30. Specifically, the respective additional items are set to the associated items of deployment time history table 30 for an associated new record. The program name 261 is moved to the program name 130, the in-use OS 262 is moved to the in-use OS 131, the computer type 263 is moved to the computer type 132, the mean installation time 264 is moved to the mean installation time 133, the mean restart time at installation 265 is moved to the mean restart time at installation 134, the number of installations 266 is moved to the number of installations 135, the mean uninstallation time 267 is moved to the mean uninstallation time 136, the mean restart time at uninstallation 268 is moved to the mean restart time at uninstallation 137, and the number of uninstallations 269 is moved to the number of uninstallations 138.

Through the processing, the construction time to construct a job operation environment can be reduced when compared with a case in which the environment is manually constructed and a case in which the lacking programs required for the disk image are simply installed and unnecessary programs for the disk image are simply uninstalled.

Although arithmetic operations are conducted for lists and sets in the first embodiment, it is also possible to similarly execute the processing by use of arrays and tables in place of the lists and the sets.

Second Embodiment

Description will now be given of another embodiment configured by modifying part of the first embodiment.

In the flowchart of FIG. 16, Step 2110 in which the manager 1 determines an in-use program layout name corresponding to the in-use disk image is employed in place of Step 2101 to obtain an in-use program layout name corresponding to the in-use disk image. In Step 2110, an input user interface for the manager 1 to determine an in-use program layout name is presented on the display 16. According to information inputted by the manager 1 using the keyboard 17 and the mouse 18, an in-use program layout name is determined.

Figure 25:
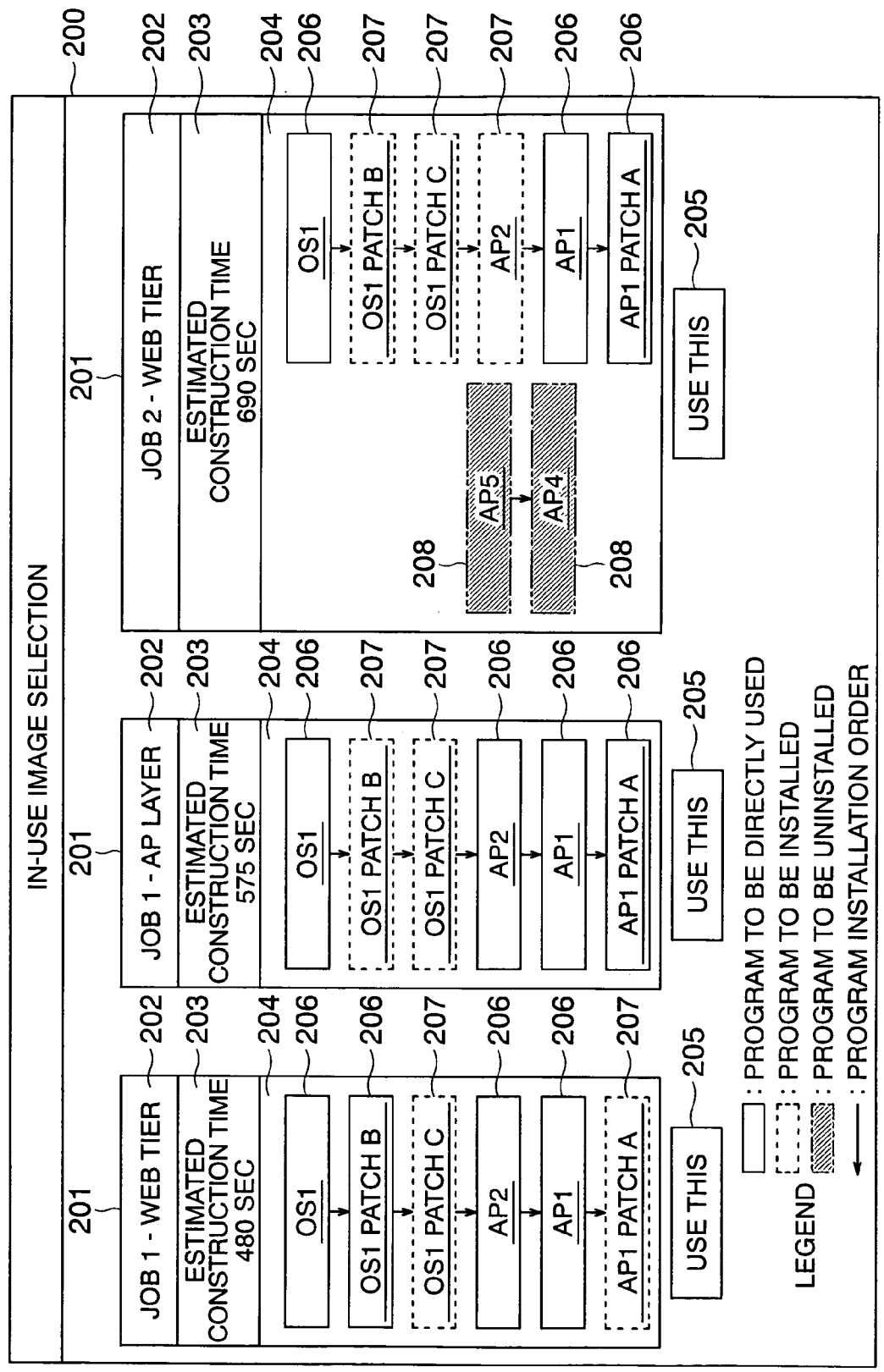
FIG. 25 is a view of a screen image showing an input user interface for the manager 1 to determine a disk image to construct a job operation environment in a second embodiment.

FIG. 25 is an input user interface for the manager 1 to determine the in-use program layout name in Step 2110. The widow 200 of FIG. 25 is a window representing the input user interface for the manager 1 to determine the in-use program layout name. Each rectangular area 201 displays information items to construct a job operation environment using a disk image such as an estimated construction time, a program to be added, a program to be deleted, a program to be used as indicated in the image, a program installation order, and a program uninstallation order.

Next, description will be given of how to create the information items displayed in the rectangular area 201. For each item of set IU as return value of Step 1003, there are created a rectangular area 201 and a "use this" button 205. In the area 201, a program layout name 202 indicates a program layout name in the element and an estimated construction time 203 indicates an estimated construction time in the element. A rectangular area 204 displays list A obtained in Step 1001 and the contents of list U in the element. Of the nodes of list A displayed in the rectangular area 204, those included in list I of the element are painted as indicated by a deleted program 208. The other nodes are displayed as ordinary rectangles as indicated by a reserved program name 206. A node of list U is painted as indicated by a deleted program 208. The reserved program name 206 indicates that the program in the disk image is used as it is. An added program 207 indicates a program to be additionally installed. A deleted program 208 is a program to be uninstalled.

The manager visually checks the reserved program 206, the added program 207, and the deleted program 208 in the rectangular area 201 and an order thereof to determine whether or not any problem occurs when the job operation environment is constructed using the disk image shown in the area 201. The manager 1 determines one of the disk images to be used in the operation environment construction and then pushes the "use this" button 205 below the area 201 corresponding to the disk image. The program layout name 202 in the rectangular area 201 over the pushed but 205 is adopted as the in-use program layout name.

Thanks to the above processing, it is possible that whether or not a job operation environment to be constructed is appropriate is beforehand manually checked to construct the job operation environment in a short period of time using an appropriate construction method without causing any problem.

Third Embodiment

Description will now be given of another embodiment implemented by partially modifying the first or second embodiment of the present invention.

FIG. 26 is a compatible program name table 31 used in the present embodiment. The table 31 includes a column of a program name 140 and a column of a compatible program name 14. The program name 140 stores a program name. The compatible program name 141 stores a set of program names. Each of the program names in the column 141 provides a function compatible to the program indicated by the column 140. That is, the programs of the program names in the column 141 can be equivalently used for the program of column 140.

Figure 27:
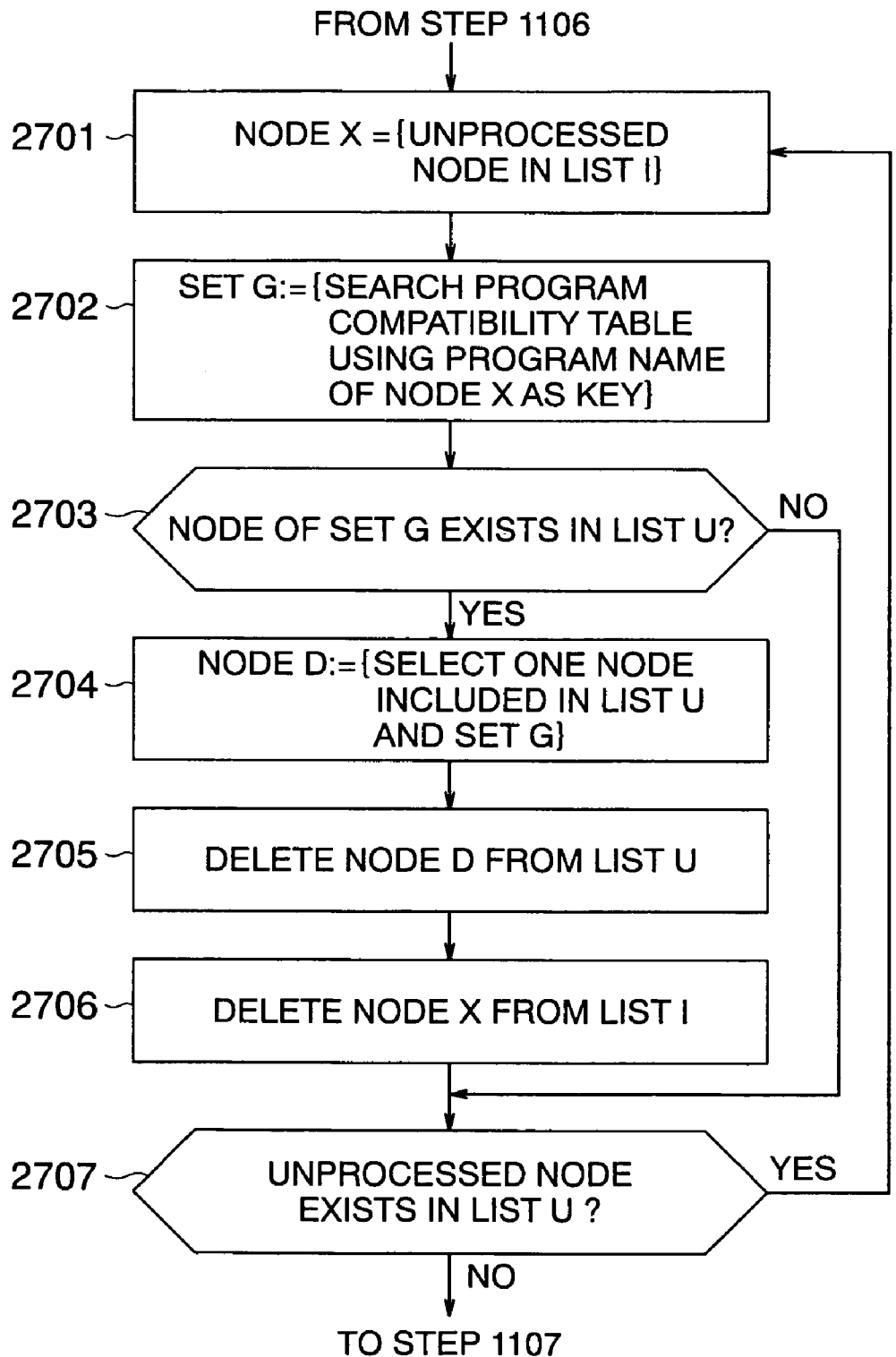
FIG. 27 is a flowchart showing a flow to be placed at a position after Step 1106 of the flow of FIG. 9 in the third embodiment.

In the embodiment, the steps shown in FIG. 27 are inserted between Steps 1106 and 1107 of FIG. 9. In the processing of FIG. 27, if a disk image under consideration does not include any program which does not exist in list A obtained in Step 1001, but includes a program compatible with a program included in list A, the compatible program is used to construct the job operation environment.

In Step 2701, a node of list I not having been processed is obtained therefrom to be set as list X.

In Step 2702, a search is made through the program compatibility table 31 using the program name of node X as a key to obtain a compatible program name 141. Resultantly, the obtained program names are formed in a set to be designated as set G.

In Step 2703, a check is made to determine whether or not the program names indicated by nodes in list U include a program name equal to a program name indicated by a node of set G. If such node exists, the process goes to Step 2704; otherwise, the process goes to Step 2707.

In Step 2704, from the program names indicated by nodes of list U, one of the program names equal to program names indicated by nodes of set G is randomly selected to be set as node D.

In Step 2705, of the nodes of list U, any node with a program name indicated by node D is deleted.

In Step 2706, from the nodes of list I, any node with a program name indicated by node X is deleted.

In Step 2706, a check is made whether or not there exists a node of list U which has not been processed yet. If such node exists, the process goes to Step 2701; otherwise, the process goes to Step 1107.

Thanks to the processing described above, it is possible that the number of installations and that of uninstallations are reduced by use of the compatible programs to thereby reduce the construction time required to construct the job operation environment.

Fourth Embodiment

Next, description will be given of another embodiment implemented by partly modifying the first, second, or third embodiment of the present invention.

Processing to set list U to an empty set is used in place of Step 1106 of FIG. 9. As a result, the unnecessary programs are not uninstalled and hence the job operation environment construction time can be reduced.

Fifth Embodiment

Some combinations of the installation order 102 of the records which have been stored in a program layout table 27 and which have one and the same program layout name are obtained by calling an external program. That is, program names are passed the external program to resultantly obtain an installation order thereof. The external program creates a plurality of combinations of the installation order, the combinations allowing the ordinary operation of the job. According to the respective installation orders, a plurality of the job operations are created. According to the respective installation orders, the construction time of the job operation environment is estimated for each installation order. This makes it possible to further reduce the construction time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A job operation environment construction method performed by a management computer for deploying various to-be-deployed programs on a deployment computer, wherein the various to-be-deployed programs are used as premise of operation of a job program on the deployment computer for constructing the job operation environment, the method comprising:
  (a) recording and keeping therein information regarding contents of at least one boot disk image;
  (b) extracting a boot disk image and additional programs from a disk image storage as the premise of operation of the job program, wherein the boot disk image includes part of the to-be-deployed programs, and the additional programs are programs lacking in the boot disk image;
  (c) obtaining a procedure to deploy the boot disk image on the deployment computer and an optimized construction procedure to construct a job operation environment including a procedure to install the programs lacking in the boot disk image and a procedure to restart an operating system;
  (d) obtaining an estimated construction time by adding a period of time required to install the boot disk image extracted in the step (b) to a period of time required for the installation procedure in the construction procedure of the optimized operation environment and for the restart of the operating system;
  (e) determining whether or not the boot disk image extracted in the step (b) is adapted to construct the job operation environment according to the estimated construction time; and
  (f) deploying the boot disk image and the programs lacking in the boot disk image on the deployment computer if the boot disk image is determined to be adapted;
  wherein the step (c) further includes a step of obtaining from the programs lacking in the boot disk image, a group of programs successively installable without restarting an operating system after the installation, wherein the obtaining is performed by referring to a database having recorded groups of programs successively installable without restarting an operating system after the installation, and optimizing the construction procedure by deleting a number of restarts of the operating system in the construction procedure to construct the job operation environment, wherein the deleted restarts allow the obtained group of programs to be successively installed without restarting an operating system.

2. The job operation environment construction method according to claim 1, the step (d) further comprising a step of obtaining estimated periods of construction time for a plurality of boot disk images respectively, and among the boot disk images, adopting one boot disk image having a shortest estimated period of construction time.

3. The job operation environment construction method according to claim 1, the step (d) further comprising a step of displaying on a screen the estimated periods of construction time calculated respectively for the boot disk images, and thereby requesting selection of one of the boot disk images.

4. The job operation environment construction method according to claim 1, wherein the to-be-deployed programs comprise an operating system, an application program operating on the operating system, and a patch program to remove a fault in a program other than the patch program.

5. The job operation environment construction method according to claim 1, wherein:
  the step (c) includes a step of extracting programs unnecessary in the boot disk image for the to-be-deployed programs as the premise of operation of the job program; and
  the step (f) includes a step of uninstalling the programs unnecessary in the boot disk image from the deployment computer.

6. The job operation environment construction method according to claim 5, wherein the step (c) further includes a step of obtaining from the programs unnecessary in the boot disk image, a group of programs successively uninstallable without restarting an operating system after the uninstallation, wherein the obtaining is performed by referring to a database having recorded groups of programs successively uninstallable without restarting an operating system after the uninstallation, and optimizing the construction procedure by deleting a number of restarts of the operating system in the construction procedure to construct the job operation environment, wherein the deleted restarts allow the obtained group of programs to be successively uninstalled without restarting an operating system.

7. The job operation environment construction method according to claim 5, the step (c) further includes a step of obtaining a group of patch programs associated with programs unnecessary in the boot disk image, wherein the uninstallation of the programs unnecessary in the boot disk image removes the need to uninstall the obtained group of patch programs, and wherein the obtaining is performed by referring to a database having recorded correspondence information between patch programs and patch objective application programs associated with the patch programs from the programs unnecessary in the boot disk image, deleting a procedure of uninstalling the patch programs included in the group, and thereby optimizing the construction procedure to construct the job operation environment.

8. The job operation environment construction method according to claim 1, wherein the step (b) further includes a step of removing, from the programs lacking in the boot disk image, any programs determined to be compatible with a program already in the boot disk image, wherein the determining is perform by referring, when obtaining the programs lacking in the boot disk image, to a database having recorded groups of compatible programs.

9. A job operation environment construction method performed by a management computer, in which various to-be-deployed programs used as a premise of operation of a job program when respectively deployed on a deployment computer are deployed on the deployment computer to thereby constructing a job operation environment, the method comprising:
   a first step of extracting, by referring to a table having recorded information of contents of boot disk images accumulated in advance, a boot disk image from disk image storage, the boot disk image including part of the to-be-deployed programs and obtaining programs lacking in the boot disk image extracted from disk image storage as above for the to-be-deployed programs as a premise of operation of the job program;
   a second step of obtaining an optimized construction procedure to construct a job operation environment including a procedure to install the programs lacking in the boot disk image and a procedure to restart an operating system;
   a third step of obtaining an estimated construction time by adding a period of time required to install the boot disk image extracted in the second step to a period of time required for the installation procedure in the construction procedure of the optimized operation environment and for the restart of the operating system; and
   a fourth step of determining, according to the estimated construction time, whether or not the boot disk image extracted in the first step is adapted to construct the job operation environment according to the estimated construction time;
   a fifth step of obtaining from the programs lacking in the boot disk image, a group of programs successively installable without restarting an operating system after the installation, wherein the obtaining is performed by referring to a database having recorded groups of programs successively installable without restarting an operating system after the installation, and optimizing the construction procedure by deleting a number of restarts of the operating system in the construction procedure to construct the job operation environment, wherein the deleted restarts allow the obtained group of programs to be successively installed without restarting an operating system.

10. A job operation environment construction system using various to-be-deployed programs to be deployed as a premise of operation of a job program on a deployment computer for constructing a job operation environment by deploying the to-be-deployed programs on the deployment computer, the system comprising a management computer and a disk image storage, wherein:
   said disk image storage stores therein information regarding contents of at least one boot disk image, wherein the management computer is adapted to:
   extract a boot disk image and additional programs from the disk image storage as the premise of operation of the job program, wherein the boot disk image includes part of the to-be deployed programs, and the additional programs are programs lacking in the boot disk image;
   obtained a procedure to deploy the boot disk image on the deployment computer and an optimized construction procedure to construct a job operation environment including a procedure to install the programs lacking in the boot disk image and a procedure to restart an operating system;
   obtain an estimated construction time by adding a period of time required to install the extracted boot disk image to a period of time required for the installation procedure in the construction procedure of the optimized operation environment and for the restart of the operating system;
   determine whether or not the extracted boot disk image is adapted to construct the job operation environment according to the estimated construction time; and
   deploy the boot disk image and the programs lacking in the boot disk image on the deployment computer if the boot disk image is determined to be adapted;
   wherein the management computer is further adapted to obtain from the programs lacking in the boot disk image, a group of programs successively installable without restarting an operating system after the installation, wherein the obtaining is performed by referring to a database having recorded groups of programs successively installable without restarting an operating system after the installation, and optimizing the construction procedure by deleting a number of restarts of the operating system in the construction procedure to construct the job operation environment, wherein the deleted restarts allow the obtained group of programs to be successively installed without restarting an operating system.

11. A non-transitory computer-readable medium having stored thereon computer-executable instructions for a job operation environment construction method for deploying various to-be-deployed programs on a deployment computer, wherein the various to-be-deployed programs are used as premise of operation of a job program on the deployment computer for constructing the job operation environment, and wherein the job operation environment construction method comprises:
   (a) recording and keeping therein information regarding contents of at least one boot disk image;
   (b) extracting a boot disk image and additional programs from a disk image storage as the premise of operation of the job program, wherein the boot disk image includes part of the to-be-deployed programs, and the additional programs are programs lacking in the boot disk image;
   (c) obtaining a procedure to deploy the boot disk image on the deployment computer and an optimized construction procedure to construct a job operation environment including a procedure to install the programs lacking in the boot disk image and a procedure to restart an operating system;
   (d) obtaining an estimated construction time by adding a period of time required to install the boot disk image extracted in the step (b) to a period of time required for the installation procedure in the construction procedure of the optimized operation environment and for the restart of the operating system;

(e) determining whether or not the boot disk image extracted in the step (b) is adapted to construct the job operation environment according to the estimated construction time; and (f) deploying the boot disk image and the programs lacking in the boot disk image on the deployment computer if the boot disk image is determined to be adapted;

wherein the step (c) further includes a step of obtaining from the programs lacking in the boot disk image, a group of programs successively installable without restarting an operating system after the installation, wherein the obtaining is performed by referring to a database having recorded groups of programs successively installable without restarting an operating system after the installation, optimizing the construction procedure by deleting a number of restarts of the operating system in the construction procedure to construct the job operation environment, wherein the deleted restarts allow the obtained group of programs to be successively installed without restarting an operating system.

* * * * *